(12) United States Patent
Englert et al.

(10) Patent No.: US 12,061,142 B2
(45) Date of Patent: Aug. 13, 2024

(54) METHOD FOR DETERMINING PHYSICOCHEMICAL PROPERTIES OF NANOSCALE SYSTEMS (NSS)

(71) Applicant: SMARTDYELIVERY GMBH, Jena (DE)

(72) Inventors: Christoph Englert, Jena (DE); Marc Lehmann, Jena (DE); Ivo Nischang, Jena (DE); Ulrich Schubert, Jena (DE)

(73) Assignee: SMARTDYELIVERY GMBH, Jena (DE)

( * ) Notice: Subject to any disclaimer, the term of this patent is extended or adjusted under 35 U.S.C. 154(b) by 190 days.

(21) Appl. No.: 17/310,592

(22) PCT Filed: Feb. 5, 2020

(86) PCT No.: PCT/EP2020/052816
§ 371 (c)(1),
(2) Date: Aug. 12, 2021

(87) PCT Pub. No.: WO2020/164983
PCT Pub. Date: Aug. 20, 2020

(65) Prior Publication Data
US 2022/0099547 A1   Mar. 31, 2022

(30) Foreign Application Priority Data

Feb. 14, 2019   (EP) .................................... 19157202

(51) Int. Cl.
*G01N 15/04*   (2006.01)
*G01N 11/00*   (2006.01)
(Continued)

(52) U.S. Cl.
CPC .......... *G01N 15/042* (2013.01); *G01N 11/00* (2013.01); *G01N 2015/0038* (2013.01); *G01N 2015/045* (2013.01)

(58) Field of Classification Search
None
See application file for complete search history.

(56) References Cited

U.S. PATENT DOCUMENTS

| | | | | |
|---|---|---|---|---|
| 5,095,451 A | * | 3/1992 | Allen | ................... G01N 15/042 702/29 |
| 6,278,518 B1 | | 8/2001 | Schrof | |

(Continued)

FOREIGN PATENT DOCUMENTS

| | | |
|---|---|---|
| JP | H11-132950 A | 5/1999 |
| JP | 2005-043158 A | 2/2005 |
| JP | 2017-75390 A | 4/2017 |

OTHER PUBLICATIONS

Lebowitz, et al.; "Modern analytical ultracentrifugation in protein science: A tutorial review", Protein Science (2002), 11:2067-2079.
(Continued)

*Primary Examiner* — Daniel S Larkin
(74) *Attorney, Agent, or Firm* — Abel Schillinger, LLP

(57) ABSTRACT

The invention relates to a method for determining the physicochemical properties of a nanoscale system (NSS) using analytical ultracentrifugation), comprising the steps of generating a multi-dimensional sedimentation analysis map associated with the NSS of interest; selecting sample-dependent parameters; determining sedimentation coefficient value/parameter in the sample; inserting sample sedimentation coefficient values onto the multi-dimensional sedimentation analysis map to obtain a NSS sample map value; and inferring from the NSS sample map value the physicochemical properties of the NSS sample. Furthermore, the invention relates to a system for performing the method, a computer program product and a computer readable storage medium.

19 Claims, 18 Drawing Sheets

(51) Int. Cl.
    *G01N 33/543*     (2006.01)
    *G01N 15/00*     (2006.01)

(56) References Cited

U.S. PATENT DOCUMENTS

| | | | |
|---|---|---|---|
| 9,603,870 B2 | | 3/2017 | Mortenson |
| 10,429,288 B2* | | 10/2019 | O'Riordan ........... G01N 1/4077 |

OTHER PUBLICATIONS

W. Machtle, L Borger, "Analytical Ultracentrifugation of Polymers and Nanoparticles", Springer, Berlin, 2006, Chapter 3.5.3., pp. 80-84.

Mircea Rasa et al: "Progress in the characterization of synthetic (supramolecular) polymers by analytical ultracentrifugation", Soft Matter, vol. 2, No. 7, Jan. 1, 2006 (Jan. 1, 2006), pp. 561-572.

Andreas Winter et al: "Synthesis and characterization of metallo-supramolecular polymers", Chemical Society Reviews, vol. 45, No. 19, Jan. 1, 2016 (Jan. 1, 2016), pp. 5311-5357.

\* cited by examiner

"new NSS":
Gold-nanorods in different solvent

"new NDDS": liposomes with identical drug and targeting moiety, different stabilizer and different additive

METHOD FOR DETERMINING PHYSICOCHEMICAL PROPERTIES OF NANOSCALE SYSTEMS (NSS)

TECHNICAL AREA

The invention relates to a method for determining the physicochemical properties of a nanoscale system (NSS) using analytical ultracentrifugation. Furthermore, the invention relates to a system for performing the method, a computer program and a computer readable storage medium.

INTRODUCTION AND BACKGROUND

In the field of medical diagnostics and therapeutics, nanotechnology is thought to promote widespread clinical utilization of drugs, whose access to their site of action has so far been hampered by multiple en-route barriers. By using biocompatible nanocarriers, such as liposomes, polymers, inorganic nanoparticles, carbon nanotubes etc., improved delivery of e.g. drugs with limited water solubility may be achieved thus increasing the bioavailability of these drugs in biological systems. Moreover, by incorporating targeting features into nanoparticles, drug delivery to specific organs and to tissues located therein is possible. Despite the rapidly growing and diversified nanomedicine market, there is a lack of specific and standardized protocols concerning the characterization of the nanoparticles at a physicochemical and biological level. Standard methods to ensure quality, safety, and efficacy of nanomedicine products, prerequisite for the qualification of these products and the approval by public authorities or agencies, are lacking equally.

There is a need for a single technique able to access a multitude of parameters associated with a nanomedicine product, preferably simultaneously. Moreover, there is a demand for a conserved mass balance and dilution-free in situ analysis of such nanoscale systems (NSS), preferably under solution conditions of choice, e.g. in solutions varying with respect to pH, buffer conditions, presence or absence of serum proteins.

A suitable technique for such purposes is analytical ultracentrifugation (AUC), which emerged at the beginning of last century as a classical analytical technique. AUC has been used primarily by the biophysics community for quantitative assessment of the solution state, shape and size of proteins, including their aggregation and protein-protein interaction. AUC relies upon first-principle hydrodynamic and thermodynamic information; it therefore may be applied to determine the biophysical properties of many types of particles across a wide range of particle concentrations and sizes. AUC typically relies on two basic types of sedimentation experiments: equilibrium experiments and sedimentation velocity experiments. In sedimentation velocity experiments, the movement of material toward the cell bottom is observed in situ. Sedimentation boundaries moving toward the bottom of the cell are tracked by snapshots of their movement at specified time intervals to the reference (solvent without particles). Velocity of sedimentation depends on the hydrodynamic properties of the particle, such that particle shape, mass, and interactions of particles in solution may be derived. The sedimentation velocity of particles may be studied under conditions varying with respect to pH, ionic strength, and temperature (e.g. 4 to 40° C.). In equilibrium experiments (typically performed at lower rotor speeds), a balance between sedimentation and diffusion is aimed at. These types of experiments are useful for molar mass estimations, also properties of complexes and self-association of particles as well as quantification of binding affinities/strength between species may be determined.

In summary, a suitable technique is needed for characterizing nanoscale systems (NSS) as well as nanoscale drug delivery systems (NDDS), which can serve the entire range of sizes (i.e. from sizes <1 nm to m) and which allows the application of a wide variety of solution conditions with in situ-detection and adjustable concentrations/dilutions, while the actual experiment is dilution-free. In the present invention, AUC is disclosed to achieve this goal.

BRIEF SUMMARY OF THE INVENTION

In a first aspect, the invention relates to a method for determining the physicochemical properties of a nanoscale system (NSS) using analytical ultracentrifugation (AUC). In the context of the present invention, the term "AUC" refers to analytical ultracentrifugation encompassing speeds generated by a commercially available AUC device ranging from about 1,000 rpm to maximum speed, wherein the rotor is typically capable of speeds up to 60,000 rpm or more. The method comprises as a first step the generation of a multi-dimensional sedimentation analysis map associated with the NSS of interest, followed by the second step of selecting AUC parameters depending on the sample. In a third step, the sedimentation coefficient value per parameter is determined in the sample, e.g. each parameter (viscosity, density, etc.) is determined in the sample, in the fourth step, the sample sedimentation coefficient values are inserted onto the multi-dimensional sedimentation analysis map to obtain an NSS sample map value. In particular, the sample values are mapped onto the multi-dimensional sedimentation analysis map in order to obtain an NSS signature, respectively fingerprint. In the final step, the physicochemical properties of the NSS sample are inferred from the NSS sample map values, i.e. all physicochemical properties of the NSS sample are available, respectively derivable, from map values like a fingerprint.

An NSS is understood to comprise liposomes, solid lipid nanoparticles, polymeric nanoparticles, dendrimers, metallic particles, as well as carbon nanotubes. The aforementioned systems can carry a cargo either on the inside or outside (nanoscale drug delivery system, NDDS), can also be colored or color-encoded, etc. Liposomes are lipid based and comprise a lipid bilayer encapsulating an aqueous core, whereas solid lipid nanoparticles have a solid lipid core. Polymeric nanoparticles employ biodegradable/non-biodegradable and biocompatible/non-biocompatible polymers, wherein poly (lactic-co-glycolic acid) (PLGA) nanoparticles are prime examples of being biodegradable and biocompatible. PLGA systems comprise glycolic and lactic acid in various stoichiometric ratios. NSS may exhibit a branched or hyperbranched architecture; dendrimers are an example for organic molecular entities, which are extensively branched. These carriers allow for a wide range of different properties such as tunable molecular weight/molar mass, hydrodynamic volume, size, shape, density, stability, they can be crystalline or non-crystalline, have accessible terminal groups and potential capacity to encapsulate or bind cargo molecules due to their intricate structure, for example, polymeric NSS may bind genetic material ("polyplex system"). Metallic particles are formulated with metallic materials, e.g. gold, as in spherical gold nanoparticles, gold nanorods, gold nanocages and gold nanostars. These particles carry their cargo on their outer surface/architecture;

the release can be triggered by internal (e.g. glutathione or pH) or external stimuli (e.g. light, temperature). Carbon nanotubes are fibrillous nano-cylinders comprising of single (single walled CNTs) or multiple (multi-walled CNTs) graphene layers with length and diameter ranging from 50 nm to 100 nm and 1-5 nm to 10-100 nm, respectively.

The term "NSS" according to the invention is understood to refer to a nanoscale system wherein a nanoscale system is defined as a system with typical overall dimension from less than 1 nm to micrometers or having features within this length scale. It is understood that NSS underlie no specific limitations with respect to their overall shape. Thus, an NSS according to the invention may be a particle, wherein a particle is a small localized object to which can be ascribed several physical or chemical properties such as volume, density or mass. The NSS may adopt any geometrical form, such as globular, tubular, etc. The term "NDDS" refers to a nanoscale drug delivery system, wherein a nanoscale drug delivery system is an NSS additionally comprising a drug. Both, NSS and NDDS, are understood to refer to systems (or matrices) suspended in a solvent, wherein the term "solvent" refers to a substance, which in this case can dissolve or dilute solids, particularly NSS, with or without modulating their chemical or physical structure. In the context of the present invention, the solvents utilized are organic or water-based or organic-inorganic (hybrid) solvents or ionic liquids, such as, e.g., water, salt solutions, cell culture media or other biologically relevant solutions such as serum and blood. In the context of the present invention, the term "NSS" also includes those "NSS" which are modulated with regard to their chemical or physical structure by the solvent.

The term "sedimentation analysis map" in the context of the present invention refers to a representation of a space containing a defined number of characteristics associated with the NSS of interest and its respective components, wherein such characteristics are derived from sedimentation, particularly analytical ultracentrifugation, experiments under multiple different experimental parameter conditions (for the definition of "parameter", see below). Thus, depending on the number of characteristics, the map may be two- or three-dimensional, in the context of the present invention it is a multi-dimensional space comprising an adjustable number of independent variables. According to the method of the invention, the "sedimentation analysis map" may also include characteristics associated with the NSS and NDDS of interest which have been determined by an independent technology that are used to complement said NDDS physicochemical properties in conjunction with AUC-derived measurements.

The term "parameter" as used herein refers to any characteristic that enables the classification of a particular system. In particular, the parameter is an element of a system that is useful, or critical, when identifying the system, or when evaluating its performance, status, condition, etc. In the context of the present invention, NSS are characterized by parameters such as absorbance or refraction, relating to the optical system used for monitoring the behavior of the NSS of interest during sedimentation, in particular AUC; the monitoring of the absorbance across the cell at different values of radii is the most versatile and sensitive method to measure sedimentation behavior of the NSS in question. In refraction detection (e.g. Raleigh interference detection), a difference in refraction between the sample sector (sample in solvent) and the reference sector (solvent only) is measured. In absorbance detection, a difference in absorbance between the sample sector (sample in solvent) and the reference sector (solvent only) is measured; alternatively, direct sample sector measurements are possible in intensity mode. Detection is proportional to concentration and it may be used to detect particles at suitable concentrations. In contrast to absorbance, refraction is able to monitor also objects such as polymers that do not have a suitable light absorbing center/property or emitting center/property. While absorbance and refraction are considered simple parameters in the context of the present invention, NSS also may be characterized by degradation kinetics, which are the most complex but also most insightful parameters.

The term "sedimentation coefficient value" refers to the value of the sedimentation coefficient, s, derived from measurements of the rate of movement at which a sedimentation boundary moves in an AUC experiment. Said sedimentation coefficient depends on the shape of a particle, wherein in particles, whose shape deviates from the sphere, the frictional ratio f/f0 is larger than 1 (friction coefficient f of the molecule in question/friction coefficient f0 of a smooth sphere of the same anhydrous volume and mass). The sedimentation coefficient further depends on the molecular weight/molar mass of a particle, wherein larger particles sediment faster. The coefficient s can be measured by viewing the population of sedimenting species at suitable time intervals; as described above, during sedimentation, a boundary is created which proceeds towards higher radial values with increasing time. The conditions under which s is determined, are related to rotor speed, distance between sample and rotor center, temperature, solvent, buffer, time of centrifugation, time interval for detection, sector and optical window characteristics, and AUC instrumentation (including ultracentrifuge and detection apparatus). Data analysis is used to determine sedimentation coefficient, s, and diffusion coefficient, D; mass transport in the sector-shaped cell is described by a partial differential equation, the LAMM equation:

$$dc/dt=(1/r)(d/dr)[rDdc/dt-s\omega^2 r^2 c].$$

Data analysis can be performed employing numerical methods for solution of the LAMM equation (via molecular dynamics or numerical approximation since an analytical solution is difficult), or by means of graphical methods in case computers and/or other means of analysis are unavailable.

The term "mapping" refers to inserting the sedimentation coefficient values onto the multi-dimensional sedimentation analysis map that contextualizes other possible parameters. The use of, e.g., multiple regression analysis or any other mathematical fitting function is possible.

The term "physicochemical properties" is understood to refer to such properties that are known to be derivable from sedimentation experiments, in particular AUC experiments, or other physical means (e.g. viscosity, density). The contextualization is the basis of the present invention. Such sedimentation derived properties are the size and density of the object of interest, the concentration and the dispersity of the objects in the solution, aggregates, conjugates, etc. Furthermore, with respect to complex systems such as NSS, their integrity and stability may be inferred, wherein the particular integrity and stability may be further differentiated with respect to the solvent environment.

The method according to the present invention advantageously allows the in situ assessment of multifunctional NSS using sedimentation processes, in particular AUC, and particularly under native and relevant biological sample conditions. In the method of the invention, the sample, of which a physicochemical property is to be determined, undergoes a limited number of measurements, the results of which are mapped to a multi-dimensional sedimentation analysis map, allowing the physicochemical properties of the sample to be inferred therefrom. It therefore provides a calibration-free, reliable, widely applicable and well-characterized technique for characterizing NSS, serving the entire range of particle sizes and allowing the application of a wide variety of solution conditions without a dilution requirement during analysis.

In a preferred embodiment of the method, the nanoscale system (NSS) is a nanoscale drug delivery system (NDDS).

In a preferred implementation of the method, the step of generating the multi-dimensional sedimentation analysis map may comprise the steps of selecting parameters representative of the NSS of interest followed by the step of generating the multi-dimensional sedimentation analysis map utilizing AUC sedimentation coefficient values/parameters/concentration series of the particular NSS and any individual NSS component. By using a sufficient number of simple parameters, e.g. absorption and/or refraction, and complex parameters, e.g. density and/or degradation kinetics, and a sufficient number of concentrations in sedimentation experiments, an accurate sedimentation analysis map of high complexity and multiple dimensions may be generated relying on accurate, validated, and physicochemical principles.

In a further implementation, the parameter may be selected from the group comprising absorption/emission, refraction, density, degradation kinetics. The density of a particle is inversely related to its partial specific volume and may be, e.g., derived from sedimentation velocity experiments of particles in different solvents. The density of a particle may be determined, for example, utilizing two solvents of (known) different densities and viscosities, such as e.g. mixtures of $D_2O/H_2O$, and calculating the partial specific volume from the measured sedimentation coefficients in the solvents. The degradation kinetics of a particle are related to its stability under various ambient conditions varying with respect to pH, temperature, presence of enzymes, biological fluids, etc. In this context, the interaction of components of these fluids such as proteins or other substances of varying nature also potentially forming a "corona" such as e.g. a "protein corona" that could influence NSS integrity, is observable. The corona can, therefore, be used also to gauge the suitability for use of the specific NSS in biological fluids. The binding of components to the particle in form of a corona or covalently through particle design strategies can be studied quantitatively as well. One possible example is the system Biotin-streptavidin-antibody attached to particles surfaces. The interaction of antibodies with the particle surface and the impact on its integrity in the fluid can also be seen. This is considered a major and necessary insight for utility, applicability, and safety of an NSS system.

In a preferred embodiment of the inventive method, the parameter degradation kinetics may comprise physical parameter dependent degradation and/or chemical parameter dependent degradation. Therein, the term "physical parameter dependent degradation" refers to degradation that is caused by varying the energy supplied to the sample, i.e. thermal energy, electric current, ultraviolet radiation, or X-rays. For example, temperature dependent degradation in an NSS sample may be measured at 37° C. and compared to measurements at 4° C. or 20° C. and/or different times. "Chemical parameter dependent degradation", in contrast, refers to degradation caused by varying ambient conditions of the sample, i.e. by varying, for example, the concentration of protons (pH) or of an oxidizing or reducing agent. The term "biological parameter dependent degradation" refers to the presence of e.g. enzymes in the solvent, causing degradation of the NSS in a sample.

In a further implementation, the step of generating the multi-dimensional sedimentation analysis map may additionally comprise the step of determining the viscosity of a solvent used for suspending the NSS of interest. The viscosity of a fluid describes the fluids internal resistance to flow and therefore is a measure of fluid friction or the ease, with which a particle can move in said fluid. In order to determine viscosity, any viscometer known in the state-of-the-art may be used, such as, e.g., a glass capillary viscometer (Ubbelohde) or a rotational viscometer (rheometer) or a simple capillary/ball combination. By this step, viscosity information is added to the multi-dimensional sedimentation analysis map and it allows the in situ assessment of NSS under conditions close to intended real life conditions, i.e. in human fluids.

In an especially preferred implementation, at least three different sample-dependent parameters may be selected in the method for determining the physicochemical property of an NSS sample using AUC. The at least three different sample-dependent parameters differ with respect to the characteristic of the NSS enabling the classification of the NSS. Most preferred, the parameters may comprise the density, viscosity, and optical detection. Herein, the term "optical detection" refers to optical detection methods such as absorbance, refraction, emission, fluorescence, luminescence, scattering, etc. When measuring an NSS sample which is identical to the NSS used for generating the multi-dimensional sedimentation analysis map, only three different parameters have to be selected and measured for the sample of interest. Using at least three different parameters for any given NSS sample, its physicochemical properties may be determined efficiently by using only a limited number of sedimentation steps, in particular AUC sedimentation steps. At the same time, the method for determining the physicochemical properties is reliable and repeatable due to the quantitative nature of the experimental system.

In a preferred embodiment, the physicochemical property may be selected from the group consisting of NSS size, NSS molecular weight/molar mass, NSS concentration, NSS dispersity, NSS aggregate, NSS integrity, and NSS stability.

The NSS size may be determined based on the size of hydrodynamic equivalent spheres, i.e. based on their hydrodynamic diameter, dh. The hydrodynamic diameter, dh, is accessible via the relation: $d_h = 3\sqrt{2}\sqrt{[s]v}$ from sedimentation velocity experiments.

The NSS molar mass may be derived from the Svedberg equation $$s/D = M(1-v\varrho_0)/RT,$$

wherein M denotes the particle molar mass, and R denotes the gas constant (Svedberg and Pedersen 1940). While the sedimentation coefficient s (obtained from the migration of the sedimentation boundary with time) and the diffusion coefficient D (obtained from the spread of the sedimentation boundary with time) are derived from sedimentation velocity experiments, the molar mass may also be obtained from an obtained balance between sedimentation and diffusion, i.e. equilibrium conditions.

The physicochemical property of NSS concentration refers to the relative concentrations of the complete NSS and its component species. It is simply readable from the optical density or any detector signal before, during, and after sedimentation, respectively by the area under the differential sedimentation coefficient distribution curve, i.e. inverse intensities over units S. Choice of angular velocities allows for selective fractionation of components in the sample.

NSS dispersity and NSS aggregates refer to properties relating to the distribution of the NSS in the given solvent, wherein said properties may be derived directly from the respective sedimentation velocity profile. The same applies to the properties of NSS integrity and NSS stability.

In a particularly preferred implementation of the method of the invention, NSS integrity may comprise the integrity of the NSS in a solvent selected from the group comprising water, salt solution, organic solvent, and biologically relevant fluids. Herein, a solvent is a substance that dissolves or disperses a solute, i.e. an NSS, resulting in a solution/dispersion. While in the context of the method of the invention, most of the solvents are water-based, organic solvents may also suitably used, e.g. for storing NSS. The term "biologically relevant fluid" refers to a solvent relevant to living systems, such as cell culture or organisms. Hence, a biologically relevant fluid according to the present invention is cell culture medium, serum, or blood.

In a further embodiment, the NSS may comprise at least two different components. As stated above, an NSS is understood to refer to a system comprising at least two separate entities wherein each entity exhibits a dimension sized from less than 1 nm to micrometers or has features within this length scale. The term "NDDS" refers to a nanoscale drug delivery system, wherein a nanoscale drug delivery system is an NSS also comprising a drug. An NSS is understood to comprise liposomes, solid lipid nanoparticles, polymeric nanoparticles, dendrimers, metallic particles, as well as carbon nanotubes, when viewed from the structural point of view. Each type of these particles may consist of polymers, metals and metal oxides, lipids, proteins, DNA or other organic compounds. Furthermore, the term "NSS" according to the invention is understood to refer to a nanoscale system suspended in a solvent. Thus, the NSS, whose physicochemical properties are to be characterized by the method of the invention, may comprise the particle matrix and solvent (medium). The particle-matrix may comprise one or more components, such as the carrier component, targeting moieties, additive components and drug component (nanoscale drug delivery system, NDDS). In a preferred embodiment, the NSS may be such a complex polymeric NDDS system. In a more preferred embodiment, the complex polymeric system may comprise a biodegradable polymer and an encapsulated drug. In a further preferred embodiment, the complex polymeric system may comprise a targeting dye moiety and it is also preferred, when it may comprise a stabilizer, preferably surfactant. For example, a complex NSS may be composed of a biodegradable polymer (such as poly (lactic-co-glycolide), PLGA) partially functionalized by a targeting dye moiety, it may carry an encapsulated drug and may be stabilized in solution by surfactant partially incorporated into the NSS due to the preparation process.

In a particularly preferred embodiment, at least one independent AUC measurement/sample may have to be performed addressing the NSS and, preferably, one independent measurement/sample has to be performed addressing a solvent. For example, in a given sample, the sedimentation coefficient may be measured using AUC at a specific absorption wavelength (and/or using interference optics) for determining, e.g., composition and concentration. From these measurements, the NSS size may be determined using the hydrodynamic diameter, dh. Thus, the minimum number of measurements to be performed per sample is one AUC measurement, rendering the inventive method extremely time-efficient while being calibration-free and accurate at the same time. In a particularly preferred embodiment, the number of measurements to be performed per sample may be two plus at least one measurement/component changed relative to the NSS of interest. For example, the number of measurements to be performed per sample may be two, in case of viscosity to be determined, plus possible required measurements whose number depends on the components changed to the known NSS.

In a further implementation, the NSS may comprise a solvent-derived physical and/or chemical modification. The interaction of components contained in fluids, e.g., biological fluids such as proteins or other substances with the NSS, potentially forming a "corona" such as e.g. a "protein corona", could influence NSS integrity. This modification in form of a "corona" may be used to gauge the suitability for use of the specific NSS in biological fluids. For example, the NSS surface may be modified by attachment of Biotin-streptavidin-antibodies ("antibody corona"). The binding of components to the particle in form of a corona or covalently through particle design strategies can be studied quantitatively as well. The interaction of antibodies with the particle surface and the impact on its integrity in the fluid can also be seen.

In a further embodiment, the method of the invention may be implemented by a computer. In particular, step d) may be implemented by a computer, comprising means adapted for receiving the data from the preceding step, i.e. step c). The computer also may comprise means for mapping the one or more sedimentation coefficient values onto the multidimensional sedimentation analysis map, preferably by multiple regression analysis. In a particularly preferred embodiment, step e) may be implemented by a computer, comprising calculation means for inferring from the NSS sample map value the physicochemical properties of the NSS.

In a second aspect, the invention relates to a system for performing the method described above, wherein the system comprises multi-dimensional sedimentation analysis map generating means for generating a multi-dimensional sedimentation analysis map associated with the NSS of interest; means for selecting sample-dependent sedimentation AUC parameters; means for determining sedimentation coefficient value/parameter in the sample; means for inserting sample sedimentation coefficient values onto the sedimentation analysis map to obtain a NSS sample map value; calculation means for inferring from the NSS sample map value the physicochemical properties for the NSS sample, i.e. for the NSS sample of interest.

In a third aspect, the invention relates to a computer program product comprising instructions which, when the program is executed by a computer, cause the computer to carry out the steps of the method.

In a fourth aspect, the invention relates to a computer-readable storage medium comprising instructions which, when executed by a computer, cause the computer to carry out the steps of the method.

The invention will be more fully understood by reference to the following figures and examples. They should not, however, be construed as limiting the scope of the invention. It is understood that the examples and embodiments described herein are for illustrative purposes only and that various modifications or changes in light thereof will be suggested to the skilled person and are to be included within the context of this application.

BRIEF DESCRIPTION OF THE FIGURES

FIG. 2 (a) depicts a schematic protocol for characterizing a NDDS sample containing a known NSS, which is, however, only partly identical to an established ("characterized") NSS. FIG. 2 (b) depicts a schematic protocol for characterizing a new NSS sample corresponding to an established NSS but differing with respect to the solvent, whereas in FIG. 2 (c), a schematic protocol for a new NDDS sample is shown, wherein the drug and targeting moiety are identical to known components, whereas the matrix of the NDDS as well as additives and stabilizing components are unknown.

DETAILED DESCRIPTION

Figure 1:
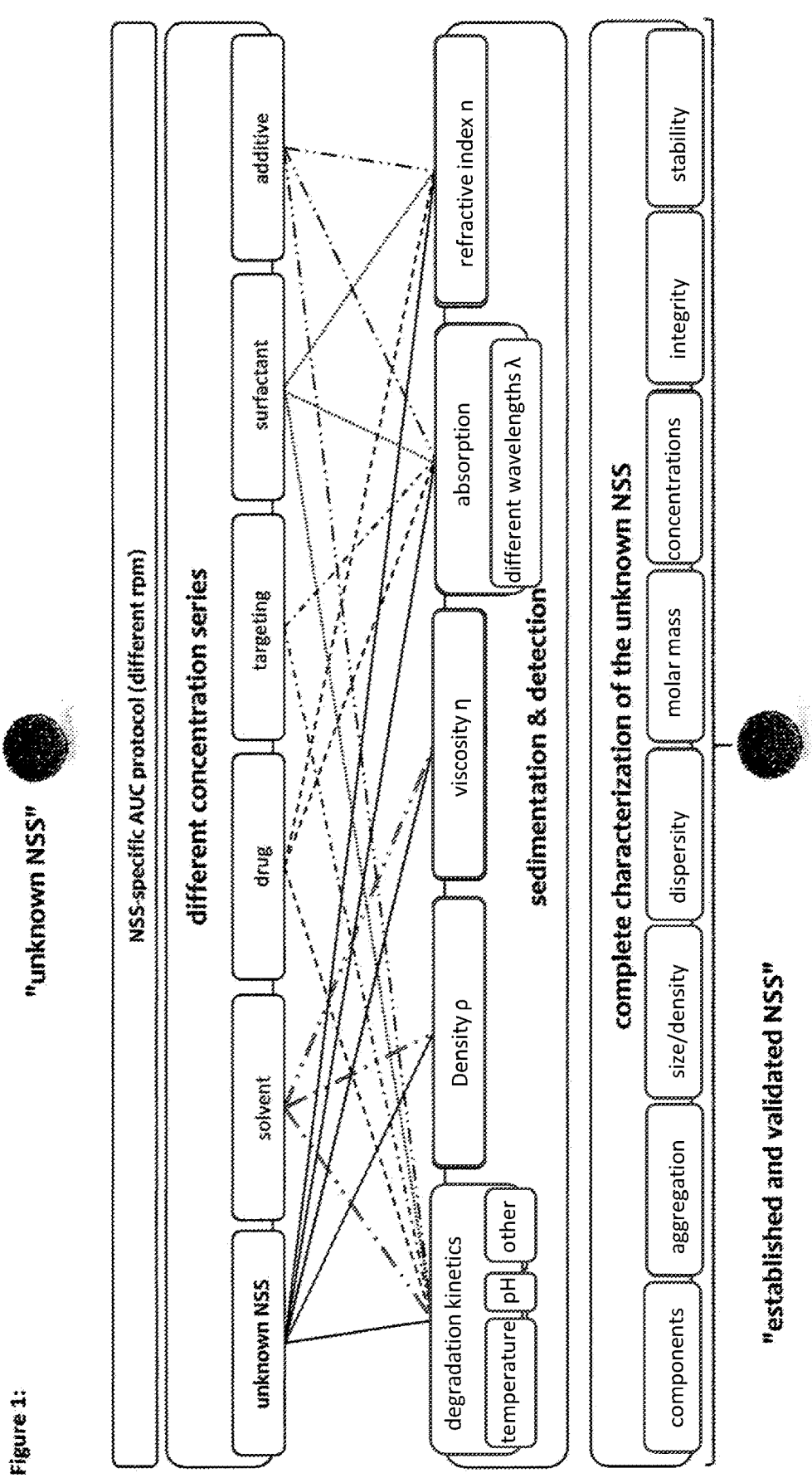
FIG. 1 depicts a flowchart of the inventive method. Herein, a schematic protocol is shown for characterizing an unknown, complex NSS with respect to different parameters and physicochemical properties.

FIG. 1 shows a schematic protocol for characterizing an unknown, complex NSS with respect to different parameters and physicochemical properties. This schematic protocol makes reference to the initial step of the method of the invention, i.e. generating the multi-dimensional sedimentation analysis map. Thus, term "unknown NSS" refers to a NSS comprising a matrix, such as PLGA, in addition to known components at known concentrations, wherein the physicochemical properties of the complete system and the respective components are yet uncharacterized utilizing AUC methods. In the example, the NSS of interest is a complex structure comprising the following components: matrix (which is not studied individually), a drug, a targeting moiety, a stabilizer (surfactant) and optionally one or more additives. Additionally, the NSS is suspended/dissolved in a solvent. Concentration series of the complete NSS and of each component of the NSS are subjected to AUC under different NSS conditions (complex parameter: degradation kinetics, which depends, e.g. on temperature, pH, etc.) using different parameters of measurement, such as optical detection (depicted here: absorption, refractive index) and rotor velocity (rpm). As explained above, density is a complex parameter (like the parameter "degradation kinetics"), which is inversely related to the partial specific volume of a NSS and may be, e.g., derived from AUC sedimentation equilibrium techniques by subjecting the NSS to AUC in a solvent gradient until equilibrium with the solvent is attained. Alternatively, the density of a particle may be determined utilizing the sedimentation coefficients of the particle in two solvents of (known) different density and viscosity, such as e.g. mixtures of $D_2O/H_2O$, and calculating the partial specific volume respectively, by its inverse, the density. The viscosity of the solvent and of the suspended NSS may be determined from measurements; alternatively, it may be derived from reference tables or the like. For an uncharacterized NSS ("unknown system"), the complete NSS and its main components have to be subjected to AUC analysis in order to generate a multi-dimensional sedimentation analysis map. For complete characterization of the exemplary NSS, all "links", which are depicted in FIG. 1 as solid, dashed and dotted lines (19 links), have to be resolved, wherein an experimental resolution by AUC is necessarily required with respect to parameters such as degradation kinetics, density, and optical detection. From the dilution series of AUC measurements of the complete NSS and its components (e.g. sedimentation coefficient values/parameters/concentration series of NSS) a multi-dimensional map is generated. From the measurement results, the physicochemical properties of the NSS may be derived, namely properties relating to size, mass and concentration, to components, to integrity and stability as well as to aggregation of NSS. Once derived, the NSS of interest is a characterized NSS ("established and validated"). For resolving the links between the NSS and its components on one side and the parameters on the other side, only a limited number of AUC measurements are required, i.e. it is possible to resolve multiple links in one AUC experiment ("run"). For example, degradation kinetics may be assessed by measuring samples simultaneously under different optical detection conditions (absorbance, refraction, emission).

Figure 2:
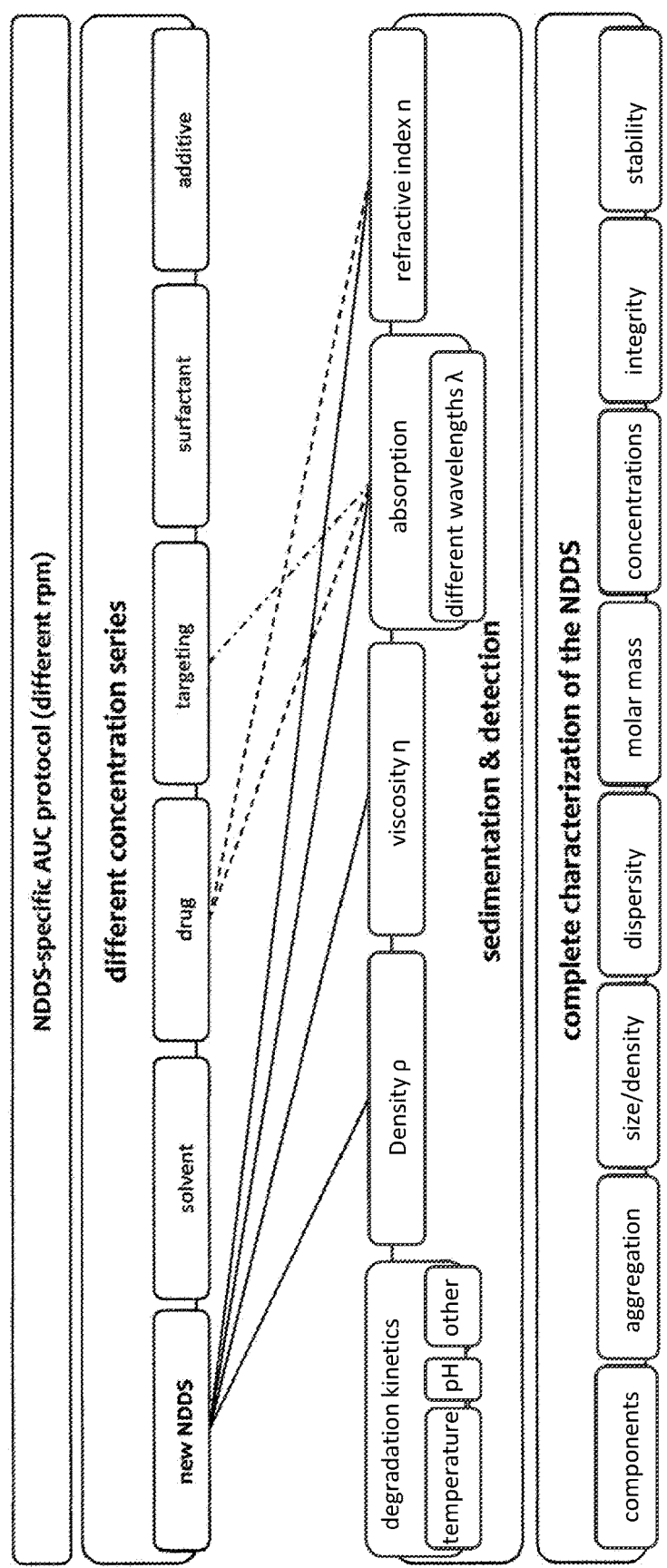
In FIG. 2 (a)-(c), schematic protocols are depicted, exemplifying the steps required (links) for characterization of unknown NSS and partially known NSS samples.
Figure 2B:
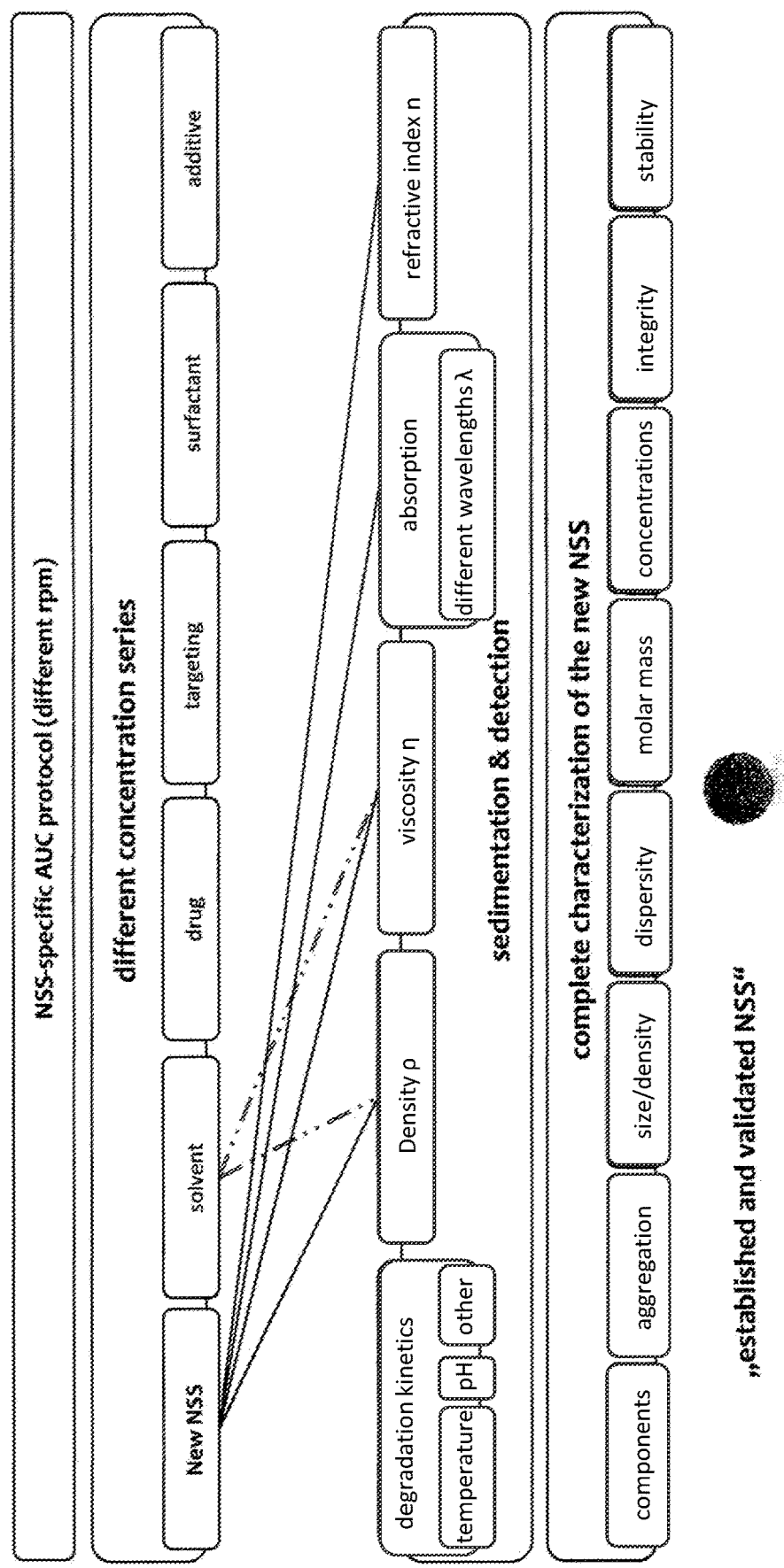
Figure 2:
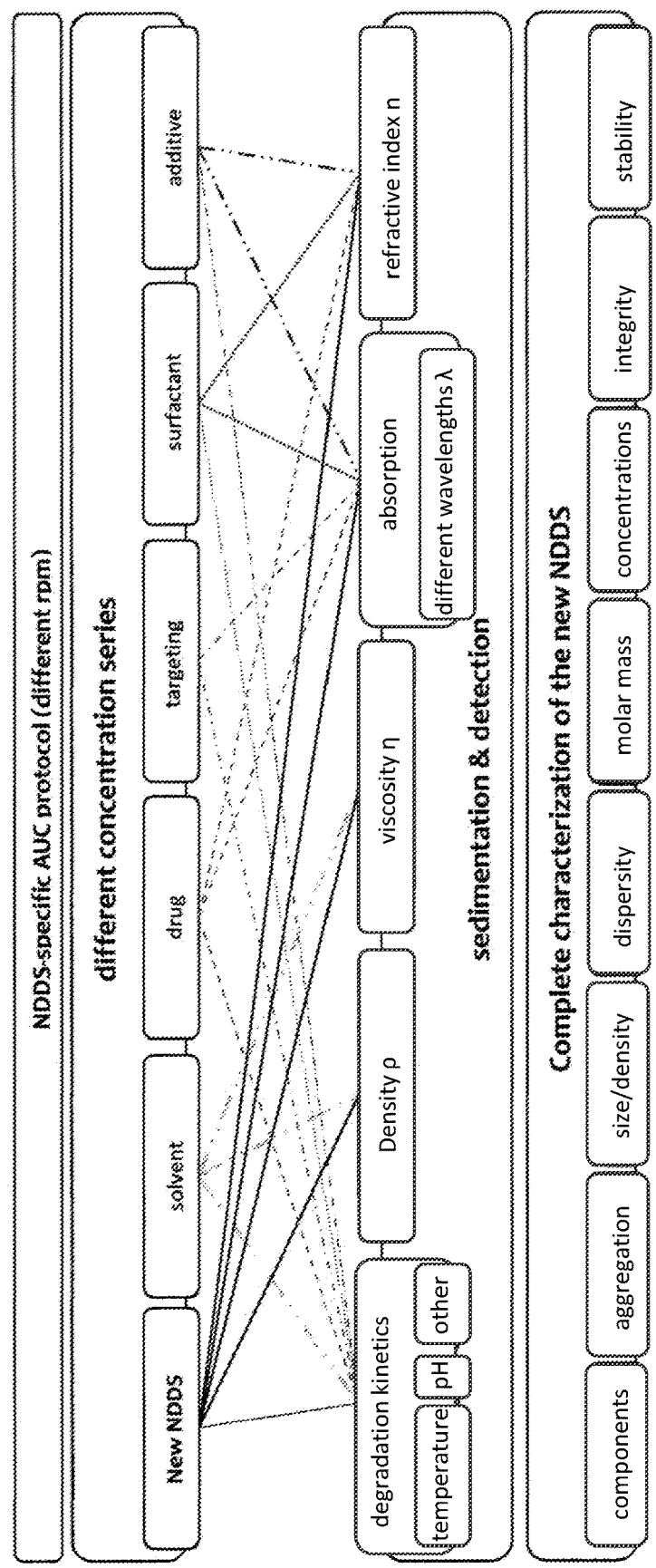

In FIG. 2 (a)-(c) schematic protocols are depicted exemplifying the steps required for characterization of unknown NSS and partially known NSS samples. In case of a fully unknown NSS, the schematic protocol of FIG. 1 has to be performed.

FIG. 2 (a) depicts a schematic protocol for characterizing a NSS sample, in particular a NDDS sample, wherein "NDDS" refers to a nanoscale drug delivery system, which is a NSS additionally comprising a drug. The depicted NDDS sample is, however, only partly identical to an established NDDS. In particular, the NDDS comprises the same main constituents as described in the above example (see FIG. 2 (a)) but differs with respect to the drug and the targeting moiety. For determining the physicochemical properties of this NDDS sample, i.e. for characterizing or qualifying the particular NDDS, only a limited number of links has to be resolved (7 links, shown as solid and dotted lines in bold). As depicted, the links between the new NDDS and the components drug and targeting moiety on the one side and the parameters density, viscosity, and optical detection (depicted here: absorption and refraction) have to be resolved, resulting in a very significant reduction of the required AUC measurements. By mapping the sedimentation coefficient values/parameter/concentration series of the complete NDDS and its possible components (e.g. drug, targeting moiety) onto the multi-dimensional sedimentation analysis map, the physicochemical properties of the NDDS contained in the sample may be determined with high precision and in a timely manner.

In FIG. 2 (b), the same schematic protocol for characterizing a NSS (no drug load) sample based on gold-nanorods is shown. The sample containing the gold-nanorods differs from an established gold-nanorod NSS with respect to the suspension medium. For example, a patient-derived NSS sample may be characterized, requiring the characterization of patient-specific medium (blood or a dilution thereof) in order to derive physicochemical properties from the multi-dimensional sedimentation analysis map, which—for reasons of general applicability—does not comprise patient specific data. For characterizing the sample, only six links connecting the NSS and its components to the selectable parameters have to be resolved, wherein said links relate to the matrix (gold-nanorods) and the solvent. Hence, in order to characterize the NSS sample of interest, the number of individual AUC measurements required for determining the physicochemical properties of the NSS sample is limited significantly.

Correspondingly, the schematic protocol in FIG. 2 (c) exemplifies a liposome-based NDDS sample (unknown matrix), carrying a known targeting moiety and harboring a known encapsulated drug (=NDDS), but which differs with respect to the stabilizing component (surfactant) and also with regard to additive components. For characterizing the sample, only eight links have to be resolved connecting the experiment parameters with the new system and those components, which differ from the established and validated NDDS (upon which the multi-dimensional sedimentation analysis map is based). Yet again, in order to characterize the sample containing the NDDS of interest, the number of individual AUC measurements required for determining the physicochemical properties of the NDDS sample is limited significantly.

Hence, the method of the present invention allows for a precise and rapid characterization of NSS samples once the underlying NSS system and its components have been established and validated. The system also may be used to study conveniently modifications of existing established and validated NSS systems, wherein modifications only relate to components of NSS. In that way, the method of the invention may also be used in the design and testing of new NSS species.

EXAMPLES

Instrumentation

Sedimentation velocity experiments were performed with a Proteomelab XL-I analytical ultracentrifuge (Beckman Coulter Instruments, Brea, Calif.), using double-sector epon centerpieces with a 12 mm optical path length. The cells were placed in an An-50 Ti eight-hole rotor. Typically, sedimentation velocity profile scans were performed right after accelerating the AUC to 3,000 rpm and after 52 minutes. Subsequently, a rotor speed of 10,000 rpm was used for NSS sedimentation velocity experiments. In instances, a rotor speed of 42,000 rpm was used to resolve further details of remaining supernatant (SN), particularly PVA, that was as well investigated via sedimentation velocity experiments at 42,000 rpm. In fact, the sedimentation protocol can simply be adapted to the individual NSS by choosing a speed between 1,000 to 60,000 rpm or more. The cells were filled with ca. 440 μl sample solution in water and with ca. 420 μl $H_2O$ or $D_2O/H_2O$ as the reference. The experiments were conducted for 10 h at a rotor speed of 10,000 rpm after which the cells were taken out of the centrifuge rotor, shaken and subjected to the same procedure. After this second round of centrifugation, in some experiments the centrifuge was accelerated to 42,000 rpm. All sedimentation experiments were performed at a temperature of T=20° C. Sedimentation profile scans were recorded with interference optics (refractive index (RI)) and absorbance detection systems (at λ=462 nm and λ=660 nm) at 12 min time intervals.

The density of solvent, solvent mixtures, culture medium with and without human serum as well as human serum used for sedimentation velocity experiments were determined with a DMA4100 density meter (Anton Paar, Graz, Austria) at T=20° C.

Viscosities of solvent, solvent mixtures, culture medium without (CM) and with human serum (CMS), and human serum (HS) in accordance with its concentration with particle dilutions were determined with an Automated Micro Viscometer (AMVn, Anton Paar, Graz, Austria) at T=20° C. via a capillary/ball combination at a tilting angle of the capillary of 50°.

Data Analysis

Suitable scans were selected for data evaluation with SEDFIT using the ls-g*(s) model, i.e. by least squares boundary modelling with a Tikhonov-Phillips Regularization procedure and by assuming non-diffusing species. This model results in an apparent differential distribution of sedimentation coefficients, s. Respective integration of the distributions was used for estimating signal (weight) averages of sedimentation coefficients, s, and concentrations, c, via the integral of the differential sedimentation coefficient distributions.

The partial specific volume of NSS or NDDS, vNSS or vNDDS, and, respectively, their density QNDDS or QNSS, were determined as described by Machtle et al. (W. Machtle, L. Börger, "Analytical Ultracentrifugation of Polymers and Nanoparticles", Springer, Berlin, 2006). For this purpose, densities and viscosities of water and respective mixtures of D2O/H2O in which sedimentation velocity experiments of NDDS were performed, were measured. Equating the intrinsic sedimentation coefficient [s] in the two solvents and resolving to the partial specific volume, $V_{NDDS}$, results in the following equation:

$$v_{NDDS} = \frac{s_2\eta_2 - s_1\eta_1}{s_2\eta_2\varrho_1 - s_1\eta_1\varrho_2},$$

where s1 is the sedimentation coefficient of NDDS diluted in water, η1 the viscosity of water, and ρ1 the density of water. Dilutions with D2O were aimed at achieving a similar solution concentration of the NDDS when compared to dilutions with water.

NDDS

Cell culture media, Dulbecco's MEM (DMEM, containing 1.0 g $L^{-1}$ D-glucose) were obtained from Biochrom (Berlin, Germany). Human serum was purchased from Sigma Aldrich (obtained from human male AB plasma, USA origin, sterile-filtered).

Nanoscale drug delivery systems (NDDS) were provided by SmartDyeLivery GmbH (Jena, Germany). The NDDS consists of a poly (lactic-co-glycolide) (PLGA) copolymer functionalized with a targeting dye unit and with an encapsulated drug. The NDDS carrier system in solution, as provided, further contains the surfactant poly (vinyl alcohol) (PVA) used for the NDDS formulation process. NDDS and utilized surfactant PVA used for NDDS formulation were received via a materials transfer agreement with the following characteristics:

$NDDS_1$ (Example 1 & Example 2) was composed of the biodegradable polymer poly (lactic-co-glycolide) (PLGA) partially functionalized by a targeting-dye moiety, carrying an encapsulated drug, and are as well stabilized in solution by surfactant partly incorporated in the NDDSs due to their preparation process. Total $NDDS_1$ concentration 6.31 mg $ml^{-1}$, total drug content 167 μg $ml^{-1}$, total PVA concentration 1.90 mg $ml^{-1}$, total volume 30 ml.

$NDDS_2$ (Example 3 & Example 4) was composed of the biodegradable polymer poly (lactic-co-glycolide) (PLGA), partially functionalized by a targeting-dye moiety, carrying an encapsulated drug, and are as well stabilized in solution by surfactant partly incorporated in the NDDSs due to their preparation process. Total $NDDS_2$ concentration 4.29 mg $ml^{-1}$, total drug content 162 μg $ml^{-1}$, total PVA concentration 1.28 mg $ml^{-1}$, total volume 30 ml.

Example 1: Conceptual Suitability of AUC

Figure 3:
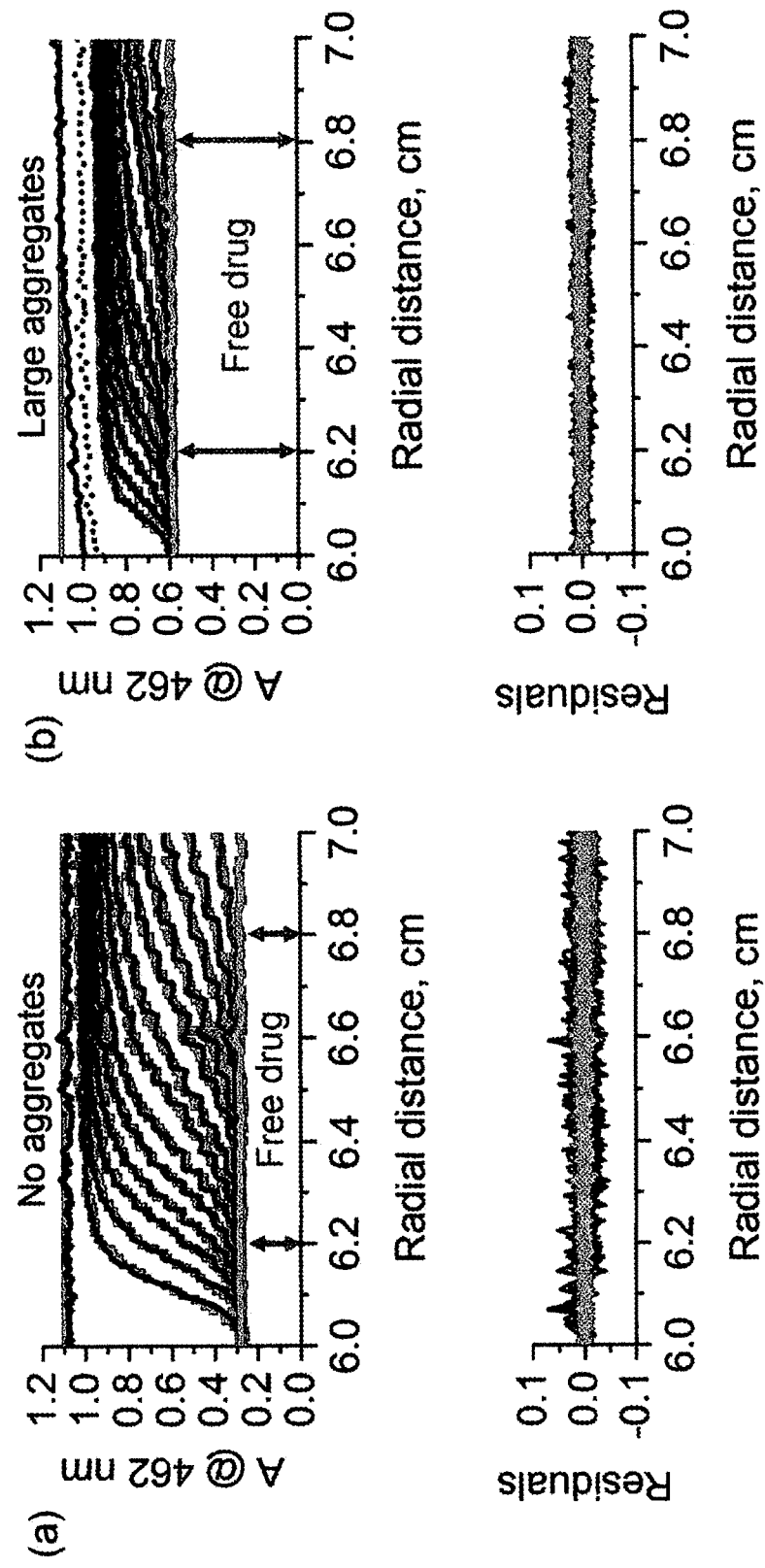
FIG. 3 depicts sedimentation velocity profiles of a NDDS sample after two weeks of storage under ambient conditions (3(a)) and after 10 weeks of storage at ambient conditions (3(b)), wherein sedimentation is tracked by absorbance detection at A=462 nm. In the upper panels of both, FIG. 3 (a) and FIG. 3 (b), the sedimentation velocity profile is depicted right after accelerating the AUC to 3,000 rpm (black line) and after 52 minutes (black dotted line) before accelerating to 10,000 rpm. The remaining sedimentation velocity profiles were recorded (gray squares) at 10,000 rpm. In the bottom panels of both, FIG. 3 (a) and FIG. 3 (b), the corresponding residuals plot from the Is-g*(s) model (solid lines) is shown.
Figure 4:
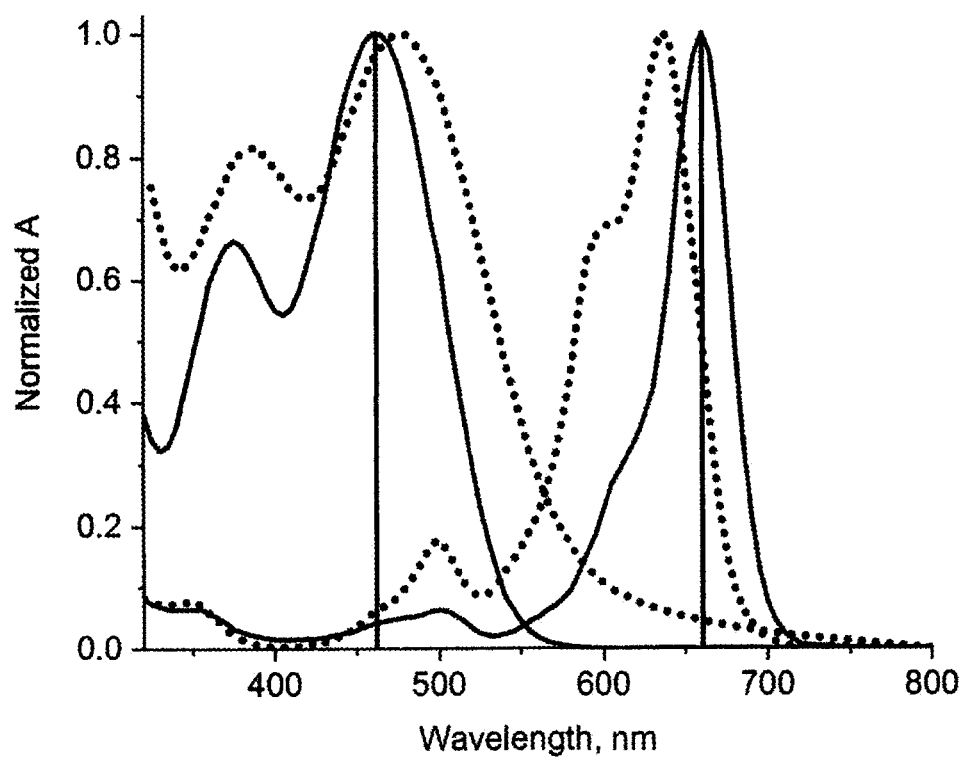
FIG. 4 depicts normalized UV-spectra of targeting dye and drug in DMSO solutions (solid lines) and diluted in water (dotted lines). The maximum for the dye shifts from $\lambda$=660 nm in DMSO down toward $\lambda$=635 in 95% water/5% DMSO, and the maximum for the drug shifts from $\lambda$=475 nm in DMSO down toward $\lambda$=462 nm in 95% water/5% DMSO.

FIG. 3 shows initial scans and the evolution of sedimentation profiles during sedimentation velocity experiments monitored at λ=462 nm of $NDDS_1$, representative of the encapsulated drug (FIG. 4). Experiments were performed at 10,000 rpm for sixteen hours. $NDDS_1$ was stored for two weeks at room temperature (FIG. 3(a)) and 10 weeks of storage under the same conditions (FIG. 3(b)), and diluted to a concentration of approximately c≈1.26 mg ml$^{-1}$. The experimental profiles (gray squares) were analyzed with the Is-g*(s) approach, i.e. by least squares boundary modelling with a Tikhonov-Phillips Regularization procedure and by assuming non-diffusing species. This model results in an apparent differential distribution of sedimentation coefficients, s, representative of the population of sedimenting species (vide infra). In both cases, the numerical solution to sedimentation velocity profiles shown as solid lines (top) represent the experiment very well, as seen by the respective residual plots (bottom), showing fluctuations of a few percent only. As well clear from FIG. 3 is remaining absorbance (A) after the population of $NDDS_1$ has migrated toward the cell bottom, larger for $NDDS_1$ stored at room temperature for 10 weeks as compared to only two weeks under same storage conditions. As well, aggregates can be seen. These aggregates are absent for two weeks under identical storage conditions of the $NDDS_1$ (see solid black and dotted lines in FIG. 3).

This just described set of experiments was performed via multi-detection, i.e. RI and absorbance at two wavelengths, after $NDDS_1$ was freshly received after preparation and purification (practically no storage) and after two weeks storage at room temperature at a concentration of c=6.31 mg ml$^{-1}$. The fresh and stored samples were appropriately diluted in a concentration range of c=0.63-1.88 mg ml$^{-1}$ and (i) universal RI detection, (ii) absorbance detection at a wavelength of λ=462 nm, representative of the encapsulated drug (FIG. 3, FIG. 4), and (iii) at a wavelength of λ=660 nm, representative of the targeting dye functionality (FIG. 4) were carried out. At day 15, one $NDDS_1$ sample, prepared at a concentration of c=1.26 mg ml$^{-1}$, was stored at T=37° C.

Figure 5:
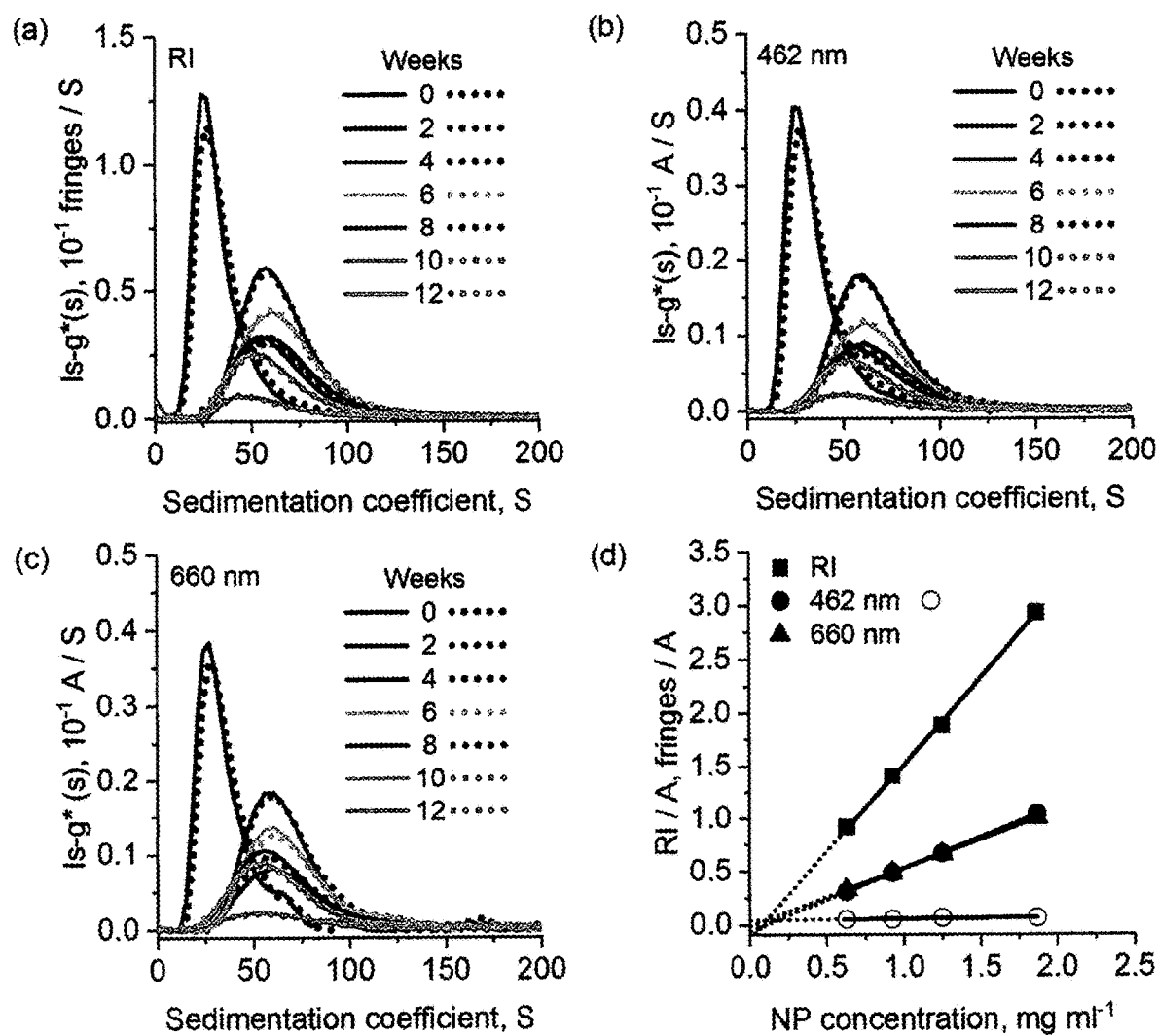
FIG. 5 depicts the differential distributions of sedimentation coefficients Is-g*(s) of $NDDS_1$ samples which were stored at ambient conditions from 0 to 12 weeks with 2 week intervals at a mass concentration of particles of c=6.31 mg $ml^{-1}$. For optical detection, an interference optical detection system (RI) (5(a)) was used, and absorbance was tracked at $\lambda$=462 nm (5(b)), and $\lambda$=660 nm (5(c)). In experiments, the stored stock sample was diluted to a concentration of $NDDS_1$ of c≈1.88 mg $ml^{-1}$. Solid lines in (a)-(c) refer to the first measurement at 10,000 rpm, dotted lines refer to the measurements performed 10,000 rpm after shaking of the cells after the first experimental run with the aim to re-establish concentration equilibrium in each cell. (d) Plot of the intensities of RI and absorbance at $\lambda$=462 nm in particles (filled circles) and SN equal to free drug (empty circles) as well as $\lambda$=660 nm (filled triangles) for the $NDDS_1$ sample prepared at the day of measurement against prepared $NDDS_1$ solution concentration.

AUC experiments have the advantage that the mass balance in the closed sector-shaped cell volume is preserved. FIG. 5 shows the evolution of the differential distribution of sedimentation coefficients, Is-g*(s), for the particles at c=1.88 mg ml$^{-1}$ starting from the freshly prepared NDDS, sample in two weeks storage steps. RI detection (FIG. 5 (a)) as well as absorbance detection at λ=462 nm, representative of encapsulated drug (FIG. 5 (b)), and at λ=660 nm, representative of targeting dye functionality (FIG. 5 (c)) were performed. Solid lines represent experiments from the first sedimentation cycle at 10,000 rpm, after which the cells were taken out the centrifuge rotor and shaken to achieve re-suspension of sedimented material. Afterwards, another sedimentation velocity experiment was performed under exactly same conditions followed by the respective sedimentation analysis (dotted lines). All solid and dotted lines are very similar, showing repeatability of the obtained results with a solution at specific storage times. In fact, all profiles from RI and absorbance detection show a similar appearance in terms of average distribution of sedimentation coefficients, Is-g*(s), as well as their trend toward storage time. The experiments were repeatable showing also that sedimentation at 10,000 rpm did not significantly affect particle integrity and estimated signal intensities of $NDDS_1$ (see solid and dotted lines). It also demonstrated that for two days at room temperature (the timescale over which the experiments were performed), changes to solution properties under conserved mass balance were barely traceable. Further clear, drug and targeting dye were located within the population of sedimenting particles since the distributions from absorbance detection (FIGS. 5 (b) and (c)) were virtually identical to that derived from the universal RI detection (FIG. 5 (a)). Another interesting observation was the apparent increase in average sedimentation coefficients after two weeks of $NDDS_1$ storage at room temperature. Further storage primarily decreased the apparent area under the curve of the differential distribution of sedimentation coefficients, Is-g*(s), in all detection modes (vide infra). FIG. 5 (d) clearly shows that all detectors correspond linearly against $NDDS_1$ concentration including the observation of the population of $NDDS_1$ by RI, observation of encapsulated drug in $NDDS_1$ at λ=462 nm, and targeting dye located in $NDDS_1$ at λ=660 nm. The existence of a small amount of free drug persisting in the supernatant (SN) at λ=462 nm was also verified. These results clearly support the inventive idea of quantitative assessment of individual concentrations of NSSs, encapsulated drug, and targeting dye functionality of NSSs in a very repetitive manner when dispersed in water.

Typically, NSSs in solution are described by the size of hydrodynamic equivalent spheres, i.e. their hydrodynamic diameter, $d_{h,NSS}$. Based on the solid sphere concept, $d_{h,NSS}$ is accessible via the relation: $d_{h,NSS}=3\sqrt{2}\sqrt{[s]v_{NSS}}$ from sedimentation velocity experiments, where $v_{NDDS}$ is the partial specific volume of NSSs and $[s]=S_{NSS}\eta_0/(-v_{NSS}\varrho_0)$ the intrinsic sedimentation coefficient defined with the solvent viscosity, $\eta_0$, and solvent density, $\varrho_0$. $v_{NSS}$, in first approximation, is inversely proportional to NSS density, $\varrho_{NSS}$, and desired for NSS size estimations. It was estimated by sedimentation velocity experiments of the particle NSS populations diluted in water only but as well $D_2O$ whose density and viscosity was determined. The partial specific volume of $NDDS_1$ was $v_{NDDS}$=0.76 cm$^3$g$^{-1}$ and hence their density $\varrho_{NDDS}$=1.32 g cm$^3$, a value close to the known bulk density of PLGA.

Figure 6:
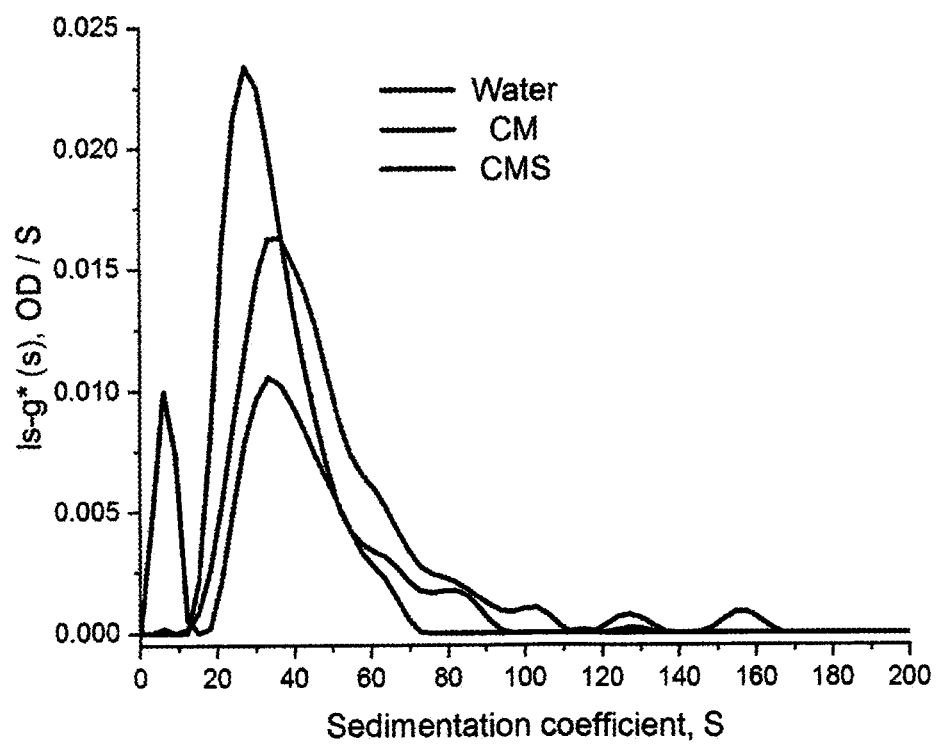
FIG. 6 depicts the differential distributions of sedimentation coefficients Is-g*(s) of $NDDS_1$ sample in water, in culture medium (CM) and culture medium with added serum (CMS) at a similar $NDDS_1$ sample concentration of c≈1.88 mg $ml^{-1}$. The measurements were performed at 10,000 rpm.

FIG. 6 shows Is-g*(s) distribution from sedimentation velocity experiments performed in water, and in culture medium (CM) without and with human serum (10 wt %) (CMS) after initial $NDDS_1$ preparation. Using absorbance detection at λ=462 nm demonstrated feasibility to as well study these solution conditions for the NDDS1 population (FIG. 6). The differential distributions of sedimentation coefficients, Is-g*(s), shifted to slightly larger values at a reduced overall absorbance intensity, more so for CMS as opposed to that of CM. As well, as opposed to CM alone, even at this relatively low speed of 10,000 rpm used for $NDDS_1$ sedimentation, a distinct population of smaller sedimentation coefficients below 10 S, originating from serum proteins, was seen. In contrast to dilutions in water, shaking solutions after the sedimentation experiment in CM and more so in CMS impose increased difficulties of complete solution reconstitution. Likely, protein components in CM such as insulin and in CMS with human serum albumin support consolidation of NDDSs centrifuged against the cell bottom. Knowledge of $NDDS_1$ properties and the assumption that the partial specific volume of the NDDSs, $v_{NDDS}$, does not change in different fluids also shows that particles in CM and CMS are slightly larger on average, an observation later re-affirmed for another batch of NDDSs further dealt with experiments performed in human serum (HS). Summarizing, it has been demonstrated that the multi-detection concept is highly useful to observe the sedimenting population of NDDSs with desirable linearity of respective detectors (RI and A) against concentration, allowing for quantitative considerations (FIG. 5 (d)). As well, it was indicated that sedimentation velocity experiments and the respective behaviour of NDDS populations under more realistic conditions such as CM and CMS media are feasible.

Example 2: Quantitative Access to Particle Integrity and Degradation

Figure 7:
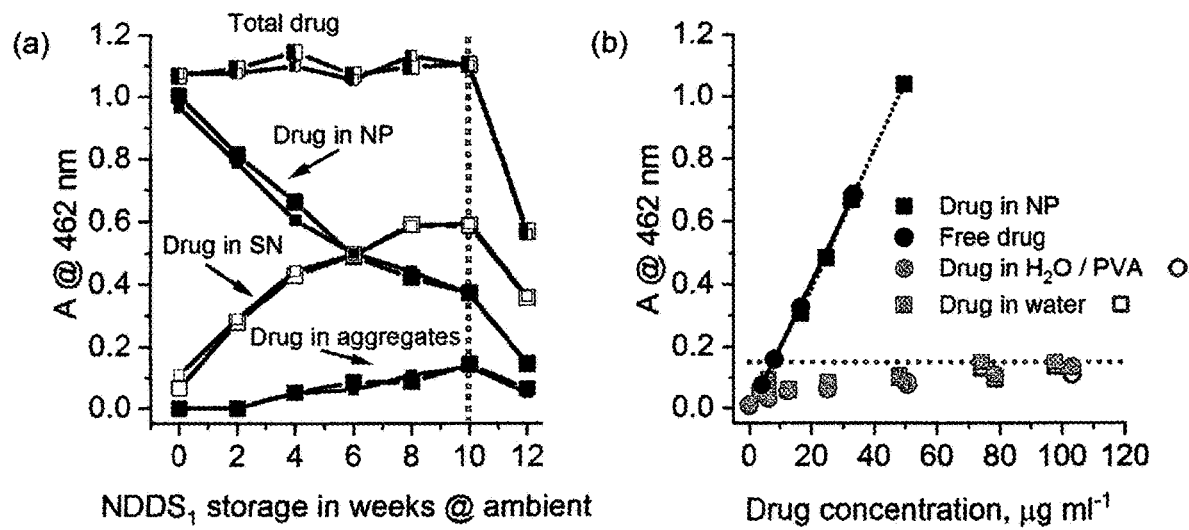
FIG. 7 depicts a plot of UV signal intensity at $\lambda$=462 nm of the different components in solution over $NDDS_1$ storage time including large undefined aggregates, drug in the persistent major nanoparticle (NP) population, and drug in supernatant (SN) solution (7 (a)) with collapse of the system after 10 weeks of storage (indicated by the dotted line). 7(b) shows plot of absorbance at $\lambda$=462 nm corresponding to drug dissolved in pure water (gray squares, open: first measurement, filled: repetition) and in water with surfactant PVA (gray circles, open: first measurement, filled: repetition) used in $NDDS_1$ formulation (circles). Shown also is the detector response for a completely degraded solution stored at c=1.26 mg $ml^{-1}$ for 7 weeks at a temperature of T=37° C. and diluted for the shown concentration range (black filled circles), while the black filled squares correspond to the encapsulated drug in NP.

The inventors further focused on an encapsulated drug for treatment purposes. FIG. 7 shows the evolution of signal intensities at λ=462 nm over the timescale of three months including repetitive measurements after each sedimentation velocity experiment (indicated by the small symbols). For this purpose, integrated distributions (Is-g*(s)) of FIG. 5(b) were utilized, representative of the drug in $NDDS_1$, as well as the remaining SN (e.g. FIGS. 3 and 5 (d)). Several features in FIG. 7 are evident. Very initially, the amount of free drug observed in the SN was low when compared to the $NDDS_1$. Upon storage, the amount of drug in the $NDDS_1$ substantially decreased with a concomitant increase of free drug in the SN. For example, after two weeks of storage of $NDDS_1$ at ambient temperature, 20% of drug has entered the particle surrounding liquid concomitant by 20% reduced signal intensity from the particle entity. Also observed was the absence of aggregates for the first two weeks of $NDDS_1$ storage (see also FIG. 3 (a)) but at apparently increased particle sizes as seen in the Is-g*(s) distribution shifting to larger values of sedimentation coefficients (FIG. 5 (a)-(c)). Allowing for further uncontrolled $NDDS_1$ degradation at room temperature, resulted in the observation of aggregates after four weeks storage at ambient. These are appearing very pronouncedly at 10 weeks of storage (see also FIG. 3 (b)). Summing all signals associated to the drug (aggregates, NDDSs, SN) showed quantitative recovery in the complex degraded solution up to 10 weeks of storage, i.e. the overall correctness of the mass balance without apparent loss of the most crucial system component, i.e. the drug. After 10 weeks of storage, solid material at the bottom of the NDDS suspension was observed, which could not be re-suspended even by vigorous vortexing and shaking. At this timescale of $NDDS_1$ storage, degradation made a significant amount of $NDDS_1$ lose identity, precipitating out from solution by forming insoluble rather undefined material. It was noted that NDDSs formed by nanoprecipitation were located in a metastable region that, due to changes in the formulation solution, particularly by degradation, may approach their energetic minimum by precipitation of polymer from solution forming water-insoluble aggregated polymeric components.

Figure 8:
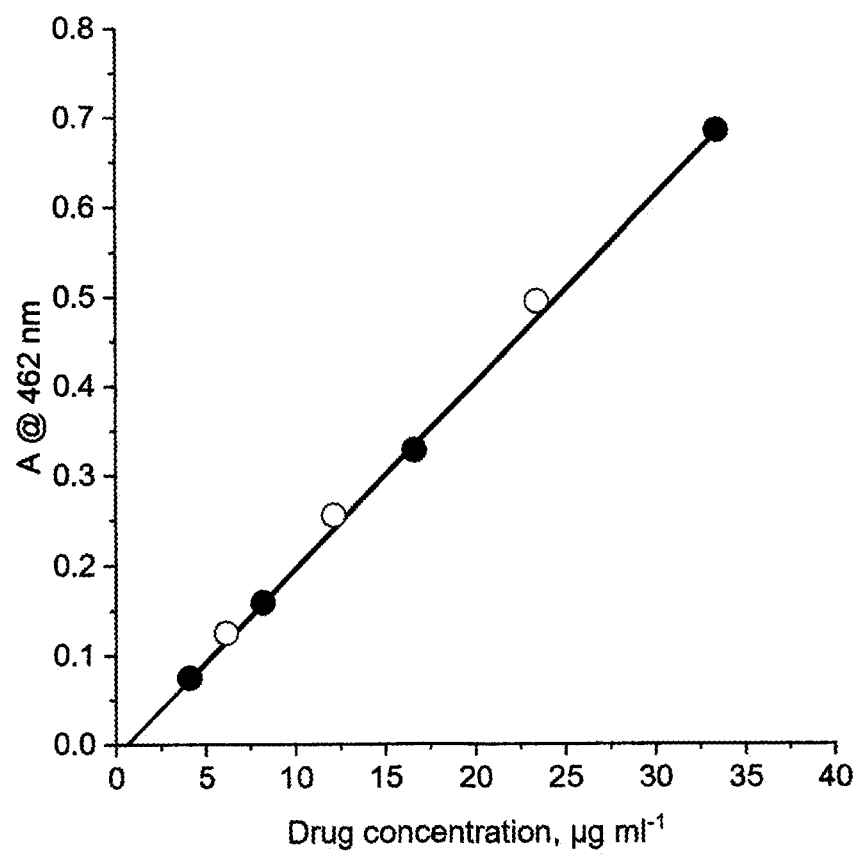
FIG. 8 depicts the spiking of drug to an already degraded solution of $NDDS_1$ (filled circles) and the check of recovery at the respective wavelength used for detection at $\lambda$=462 nm (empty circles).

In addressing validation of the apparent quantitative situation implied by FIG. 7 (a), and the perception that the drug shows poor water solubility, additional control experiments were performed. The goal was to dissolve the drug in water with and without added surfactant poly(vinyl alcohol) (PVA) that was used for $NDDS_1$ formulation. In both cases signal intensities at λ=462 nm in the AUC cells responded poorly to concentration (FIG. 7 (b)). This was accompanied by the visual observation of solid drug material precipitating at the bottom of the flasks before filling the AUC cells. These experiments also indicated that the apparently high signal intensities of free drug in SN at λ=462 nm in FIG. 3 (a) and FIG. 7 (b) originated from an enhanced solubility of the drug. The only origin being possible for this scenario was the existence of degradation products of PLGA, a polymer that appears excellently suited to encapsulate the hydrophobic drug via nanoprecipitation. While drug in NDDSs corresponds linearly to concentration it was observed as well for a completely degraded sample stored at a concentration of c=1.26 mg $ml^{-1}$ at a temperature of T=37° C. for 7 weeks, as mentioned later. The response to concentration was very similar (drug in NDDS vs. drug in completely degraded solution, FIG. 7 (b)) indicating similar absorptivity of the drug in both scenarios at λ=462 nm. Spiking drug dissolved in dimethyl sulfoxide (DMSO) to the solution of known concentration of the drug (FIG. 8), while keeping the ratio of DMSO to water constant in each spiked sample, showed quantitative recovery of additional amount of drug. The recorded signal intensities practically merged in the established signal intensity-concentration relationship (FIG. 8).

FIG. 7 (a), therefore, is a quantitative representation of existent drug (in aggregates, encapsulated in $NDDS_1$ or in SN), i.e., the opportunity to quantitatively access drug load in (i) potential aggregates, in (ii) $NDDS_1$, (iii) free drug in surrounding liquids (i.e. SN), as well as (iv) mechanistic insight in particle degradation has been demonstrated. This situation as well could be correlated to a first slight increase in $NDDS_1$ size followed by further reduction of average sizes at similar densities, i.e. their degradation. All these insights are provided by the single instrumental basis of multi-detection AUC.

Example 3: Study of Storage Conditions

With the above-described experiments on $NDDS_1$ for the quantitative utility of AUC for the described inventive purposes, another batch of NSSs ($NDDS_2$) was utilized to gain different insights. After preparation, this sample was stored at different temperatures of T=4° C. and at T=37° C. and at a concentration of c=4.29 mg $mL^{-1}$. Knowledge of the detector responses was shown as well to allow a quantitative estimation of concentration of the drug located in NDDSs and surrounding liquid at λ=462 nm (FIG. 7). A wavelength of λ=660 nm appeared representative of the targeting dye (FIGS. 4 & 5), while universal RI detection was broadly applicable for the observation of sedimenting NDDS populations supporting all observed changes.

Figure 9:
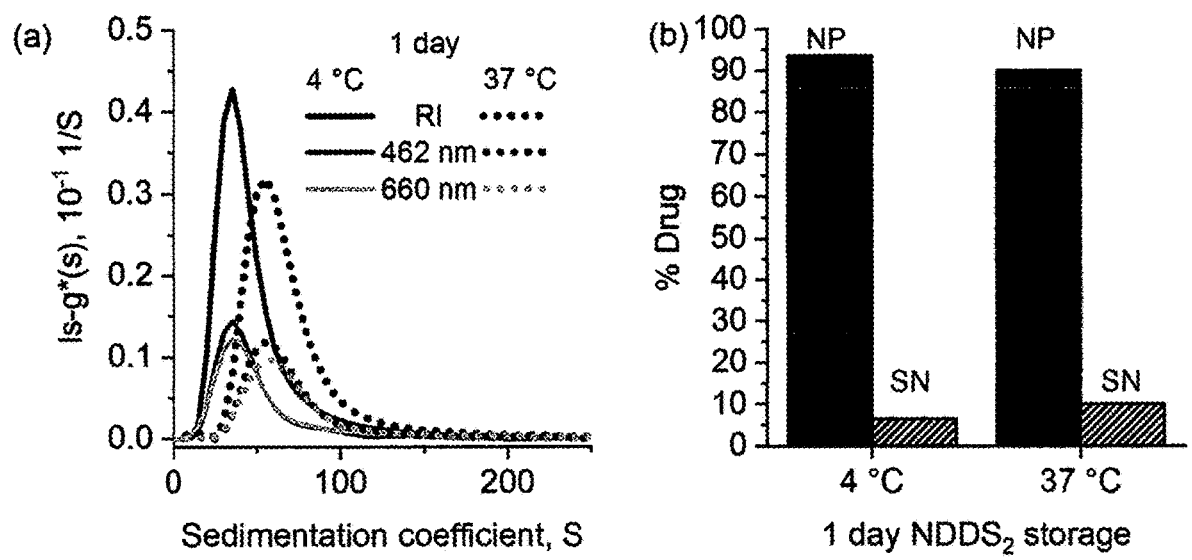
FIG. 9 depicts the differential distributions of sedimentation coefficients Is-g*(s) of $NDDS_2$ (c=0.83 mg $m^{-1}$) using the interference optical detection system (RI) as well as tracking absorbance at $\lambda$=462 nm and $\lambda$=660 nm after one night of storage at T=4° C. and T=37° C. (9(a), stored at c=4.29 mg $ml^{-1}$). 9(b) shows the percentage values of drug located in nanoparticles (NP) and those in the supernatant (SN).

FIG. 9 (a) clearly demonstrates that aliquots of $NDDS_2$ stored one night at T=4° C. in the fridge and at T=37° C. are already different in their solution appearance, i.e. the population of $NDDS_2$ stored at T=37° C. showed larger average sedimentation coefficients than that stored at T=4° C. This was in agreement with the situation that, upon storage and potential degradation, average values of the sedimentation coefficients and apparent hydrodynamic diameters, dh, NDDS, increases as shown for $NDDS_1$. Estimations of the percentage of the drug located in $NDDS_2$ and SN are shown in FIG. 9 (b). The results as well re-affirm with this batch of $NDDS_2$ the accompanied release of drug from the NDDSs and its existence in the surrounding liquid after storage overnight, more so at T=37° C. as opposed to T=4° C.

Figure 10:
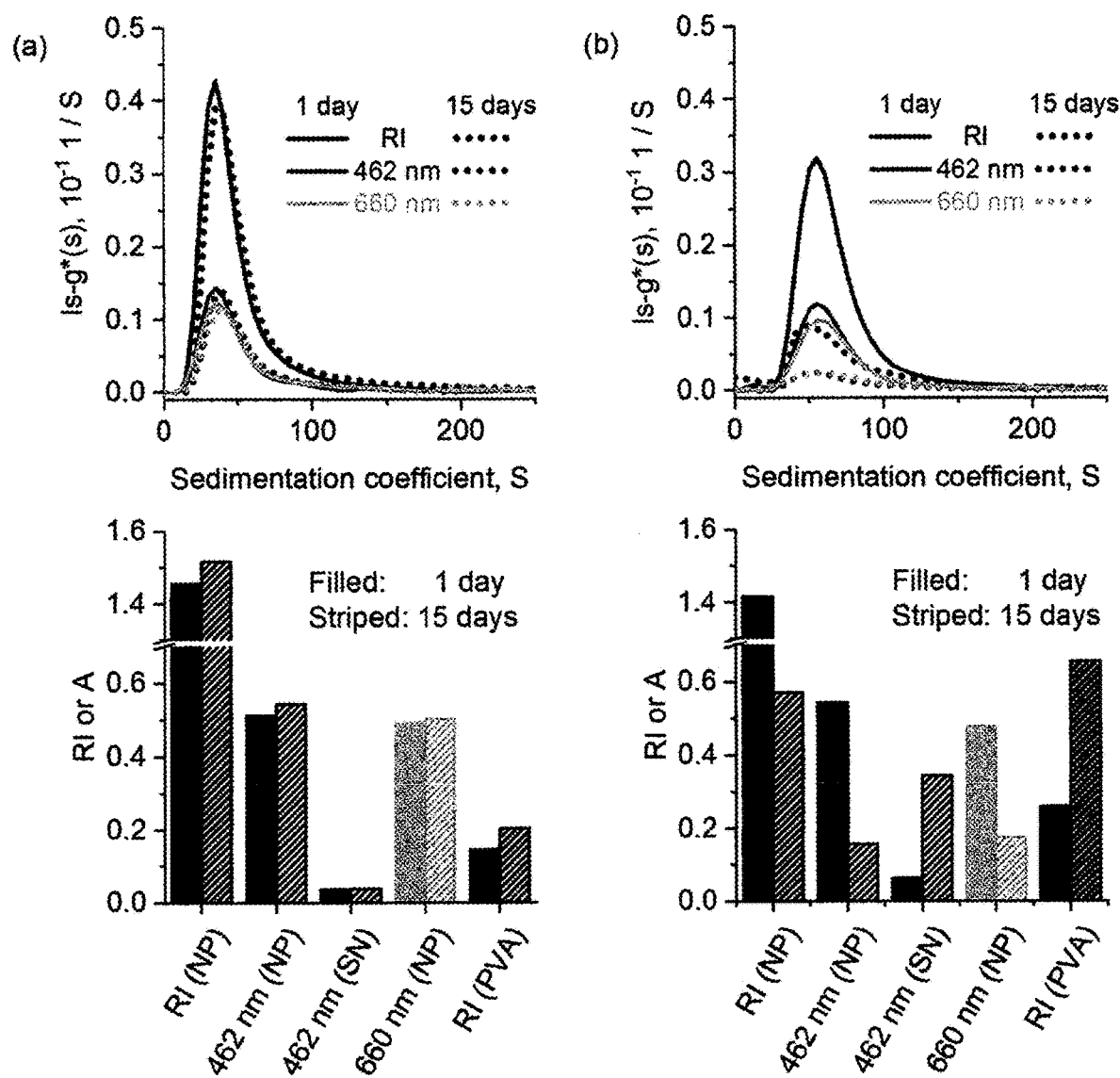
FIG. 10 depicts differential distributions of sedimentation coefficients Is-g*(s) of $NDDS_2$ (stored at c=4.29 mg $ml^{-1}$, measured at c=0.83 mg $ml^{-1}$) using the interference optical detection system (RI) as well as tracking UV absorbance at $\lambda$=462 nm and $\lambda$=660 nm at different timescales after NDDS formulation and different storage conditions. For these experiments the AUC was spun at 10,000 rpm. (10 (a)) Storage at 4° C. for 1 and 15 days, (10(b)) Storage at 37° C. for 1 and 15 days. The bottom graphs show all detector intensities recorded during the experiments, particularly also the existence of PVA in the supernatant (SN), sedimenting at 42,000 rpm.
Figure 11:
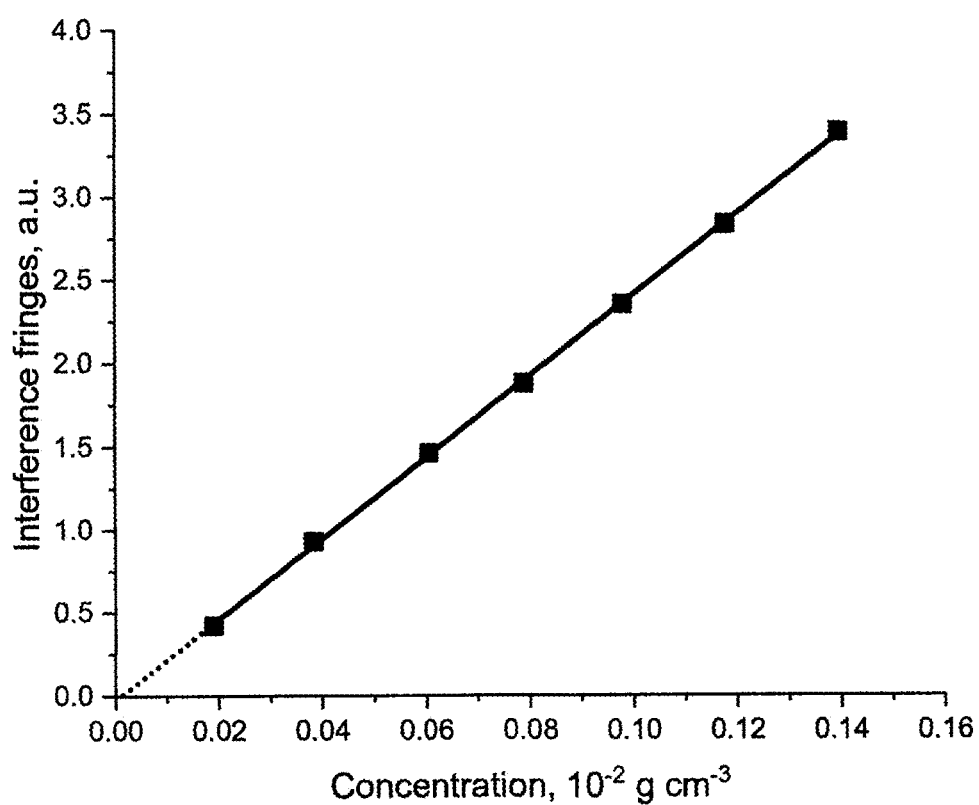
FIG. 11 depicts RI signal intensities of PVA utilized for NDDS formulation. For these experiments sedimentation velocity experiments were performed at a rotor speed of 42,000 rpm for 24 hours and at a temperature of T=20° C. The Is-g*(s) model has been utilized to confirm linearity of the RI detector by plotting the interference fringes against solution concentration.

FIG. 10 makes use of all detector responses and shows that even after 15 days of $NDDS_2$ storage at T=4° C. individual signals from the RI and UV-detector at λ=462 nm and λ=660 nm appear invariant, including that of the free drug in SN (bottom of FIG. 10 (a)). Such conditions are therefore suitable for long-term storage of NSSs without affecting their integrity and drug load. After 16 h of sedimentation experiments, observing the population of $NDDS_2$, the AUC was accelerated to 42,000 rpm allowing for further detailing of existent SN that should contain the PVA as smaller colloidal species used for NDDS formulation. In this case as well, similar RI intensities, presumably stemming from the PVA, were apparent at T=4° C. Control experiments of varying concentrations of PVA used for formulation of $NDDS_2$ and dissolved in water clearly supported this consideration (FIG. 11). Established signal intensity-concentration relationships allowed for gauging PVA polymer concentration in SN, vice versa also the amount of PVA associated to the NDDSs.

Storage at T=37° C. for 15 days (FIG. 10 (b)) indeed led to severe degradation. This degradation was clearly identifiable by a significant reduction in the RI signal intensity, absorbance at λ=462 nm in the $NDDS_2$ population and its pronounced observation in the SN (FIG. 10 (b), bottom), a result in excellent agreement to that of $NDDS_1$ particles (FIG. 5). Coupled to a significant reduction of RI intensity and that of absorbance at λ=462 nm is as well the reduction of signal intensity associated to the dye measured in $NDDS_2$ at λ=660 nm, a situation again comparable to that of $NDDS_1$ (FIG. 5C). While the maximum of absorbance of the drug was independent of its location (in NDDSs, aggregates, and SN, see FIG. 7b), the apparent loss of dye signal in $NDDS_2$ was observed without dominant appearance in the SN. While the dye has its maximum absorbance located at λ=660 nm in DMSO, a solvatochromic shift downward in wavelength to a maximum absorbance located at λ=635 nm in water was observed (FIG. 4). This supported the apparent loss of dye signal upon NDDS degradation.

Additionally, spinning the centrifuge at 42,000 rpm after $NDDS_2$ sedimentation, clearly showed an increased concentration of PVA present in the SN (FIG. 10b, bottom), a situation in concert with the assumption that it becomes partly incorporated in the particle during formulation and acting as a surfactant. It also allowed maintaining overall NDDS integrity by preventing aggregation with a stealth-like effect when NDDSs were exposed to protein-containing media (vide infra). In due course of $NDDS_2$ degradation, additional PVA entered the free solution state.

Example 4: Experiments in Human Serum

Figure 12:
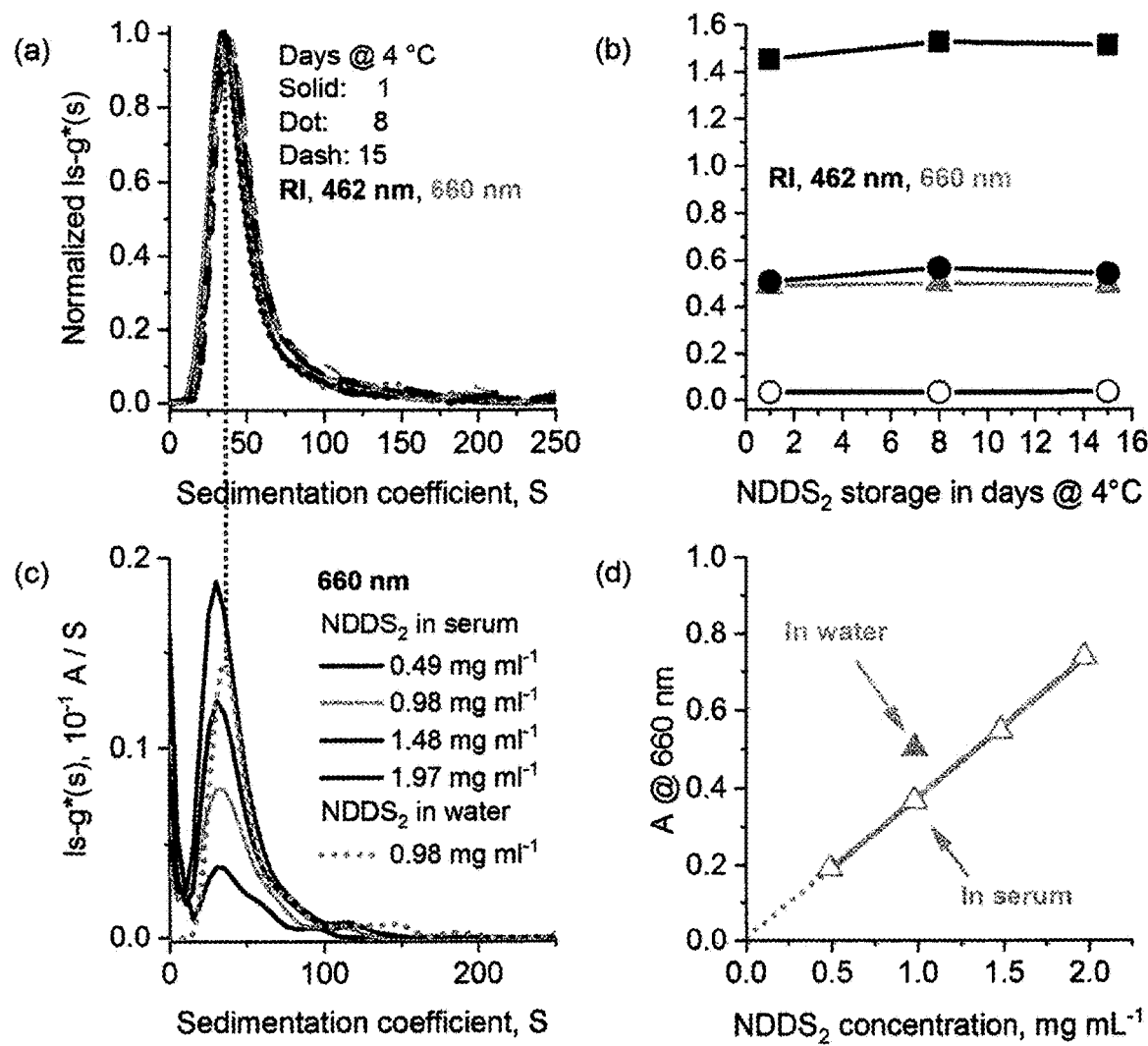
FIG. 12 depicts normalized differential distributions of sedimentation coefficients Is-g*(s) of $NDDS_2$ (stored at c=4.29 mg $ml^{-1}$, measured at c≈0.83 mg $ml^{-1}$) using the interference optical detection system (RI) as well as tracking UV absorbance at $\lambda$=462 nm and $\lambda$=660 nm at different timescales after NDDS formulation and stored at T=4° C. (12(a)). (b) Signal intensities after the different timescales of storage for all detectors, (c) varying $NDDS_2$ populations observed while sedimentation takes places in human serum (40% water/60% serum, w/w) at a wavelength of $\lambda$=660 nm, and (d) area under the differential distribution of sedimentation coefficients Is-g*(s) at $\lambda$=660 nm against $NDDS_2$ solution concentration.

FIG. 12 (a) highlights that the normalized distribution of sedimentation coefficients Is-g*(s) for $NDDS_2$ stored at T=4° C. for a timescale of 15 days is almost undistinguishable in all detection modes (RI, absorbance at λ=462 nm and λ=660 nm), as well supported by the very similar absolute signal intensities (FIG. 12 (b)).

Figure 13:
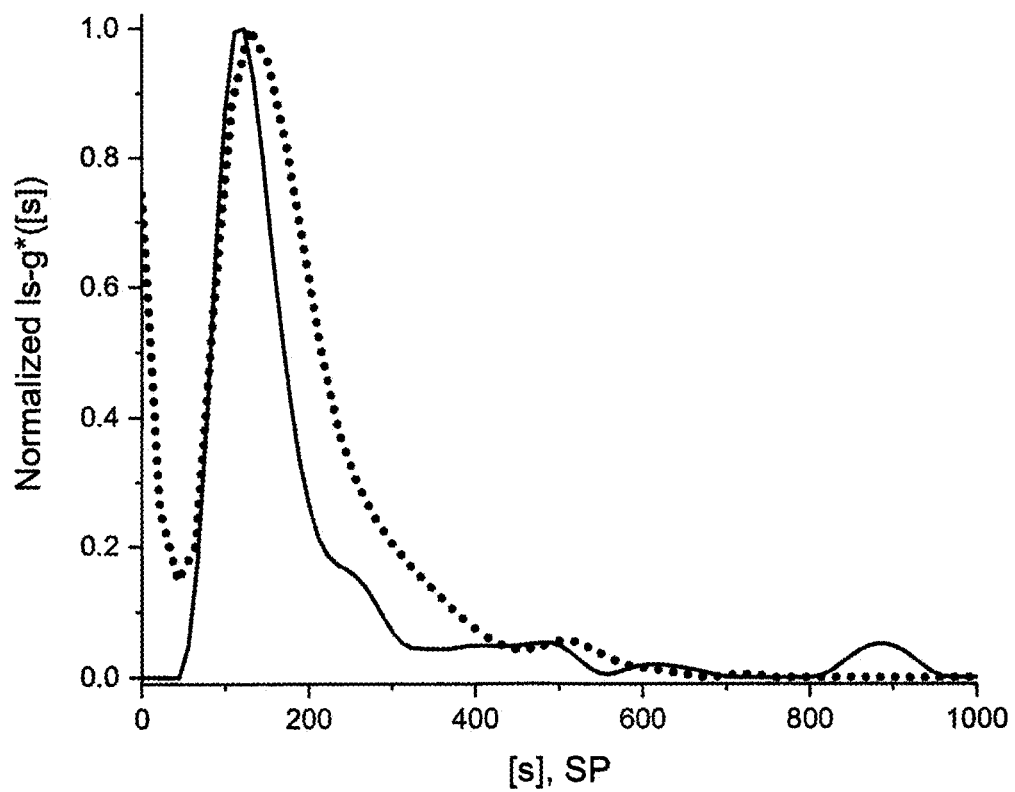
FIG. 13 depicts differential distributions of intrinsic sedimentation coefficients Is-g*([s]) of $NDDS_2$ (stored at c=4.29 mg $ml^{-1}$, measured at c≈0.83 mg $ml^{-1}$) in water (solid line) and human serum (dotted line) by taking into account the density and viscosity of solvent as well as the partial specific volume of the particles.

After nine days, $NDDS_2$ sample stored at T=4° C. was diluted with human serum such that the fraction of aqueous phase and serum (40/60, w/w) remained identical but varying $NDDS_2$ concentration. Unsurprisingly, an overall increase in the optical density was observed. Notwithstanding, at a wavelength of λ=660 nm, a wavelength that allowed tracing of the NDDS population virtually identical to that of a wavelength of λ=462 nm and RI detection (FIG. 5 for $NDDS_1$ and FIG. 10 for $NDDS_2$), was used to observe the $NDDS_2$ population. Interestingly, increased $NDDS_2$ concentrations correspond to higher signal intensities at λ=660 nm as clearly seen in FIG. 12 (c). At the same time, a rather undefined distribution of small sedimentation coefficients was apparent. These could be associated to sedimentation of rather large serum components even at relatively low speeds of 10,000 rpm. Integration of the Is-g*(s) distributions resulted in a concentration dependence that was again highly linear (FIG. 12 (d)). All $NDDS_2$ populations in serum sediment slightly slower than the $NDDS_2$ population in water. This is well-supported by the increased viscosity of human serum when compared to water. With the respective density and viscosity of the liquid media at hand, the inventors were able to establish an intrinsic sedimentation scale, [s], where $[s]=s\eta_0/(1-v\varrho_0)$ (see FIG. 13) v is the partial specific volume of the NDDSs in $cm^3g^{-1}$ (vide supra).

In fact, the differential distribution of intrinsic sedimentation coefficients, Is-g*([s]) for $NDDS_2$ shifts to slightly larger values, however, with some influence on distribution width. The calculated hydrodynamic diameter $d_{h,NDDS}=3\sqrt{2}\sqrt{[s]v_{NDDS}}$ based on the weight average sedimentation coefficient of the Is-g*(s) distribution is calculated as dh=17 nm in water and dh=18 nm in human serum, respectively. These results showed that though particles did not lose their integrity, their apparent hydrodynamic effective size only slightly increased. Maintenance of $NDDS_2$ integrity in HS appeared to originate from the "stealth-like" effect of PVA used in NSS formulation. These inventive approaches and experimental results demonstrate the opportunity and present invention of an in situ and quantitative assessment of medical NSSs under conditions most close to intended real-life conditions, i.e. in human fluids.

Further studies in human serum were conducted with two different batches of NDDS: SDL_NP 4.1 and SDL_NP 4.2, which were firstly characterized in water and then characterized in situ in human blood serum. Samples with concentrations of nanoparticles between 0.5 to 1.5 mg/mL, containing an overall 55 w % human serum, were prepared and measured at T=20° C. and n=7500 rpm in the AUC with the refractive index and absorbance detection at λ=369 nm, i.e. identical to experiments in water. Firstly, differential distributions of intrinsic sedimentation coefficients Is-g*([s]) of two different batches of NDDS: SDL_NP 4.1 and SDL_NP 4.2 were measured/determined in water. These particles differ with respect to the concentration of the targeting dye DY635, which in SDL_NP 4.1 was 33.7 µg/mL and in SDL_NP 4.2 amounted to 2.6 µg/mL.

Further characteristics are summarized in Table 1:

TABLE 1 characteristics of SDL_NP 4.1 and SDL_NP 4.2 NDDS.

|  | [DY635] | [NP] | [Drug] | PDI | Z-average DLS in NaCl |
|---|---|---|---|---|---|
| SDL_NP4.1 | 33.7 µg/mL | 5.982 mg/mL | 394 µg/mL | 0.079 | 82.5 nm |
| SDL_NP4.2 | 2.6 µg/mL | 5.855 mg/mL | 348 µg/mL | 0.138 | 99.4 nm |

Figure 14:
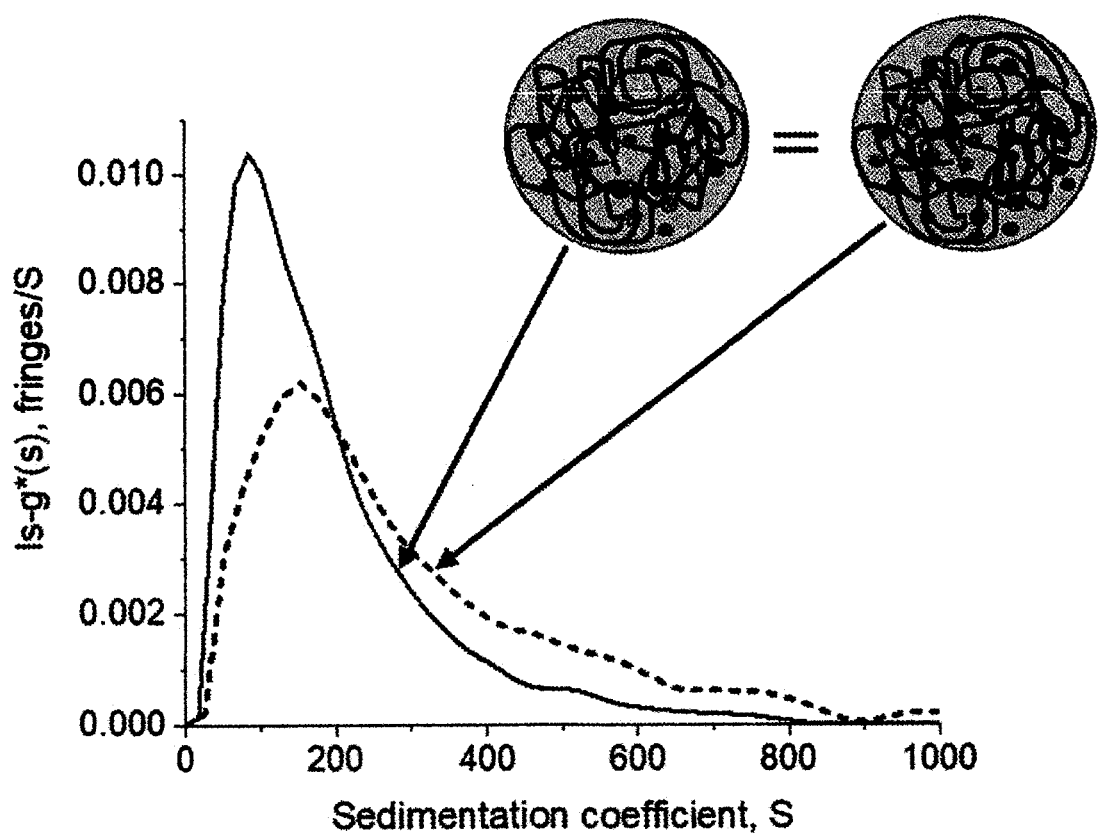
FIG. 14 depicts differential distributions of intrinsic sedimentation coefficients Is-g*([s]) of two different batches of NDDS: SDL_NP 4.1 (dashed line) and SDL_NP 4.2 (black line) measured in water. These particles differed with respect to the concentration of the targeting dye (in example DY635), which in SDL_NP 4.1 was 33.7 μg/mL and in SDL_NP 4.2 amounted to 2.6 μg/mL. Both batches were measured at c=1 mg/mL, respectively, and the measurements were performed at T=20° C., n=7500 rpm for 20 hours.

Both batches were measured at c=1 mg/mL, respectively, and measurements were performed at T=20° C., n=7500 rpm for 20 hours (FIG. 14). Clearly, the differential distributions of sedimentation coefficients of the sample with higher concentration of DY635 according to the refractive index detector was broadly distributed compared to samples with lower concentration of DY635. The situation qualitatively confirmed the DLS results regarding the increased dispersity of both samples, reflected by the increased PDI (Table 1). A PDI of 0.079 according to DLS for SDL_NP4.1 was reflected in the AUC results by a relatively narrow distribution, whereas SDL_NP4.2 with a PDI of 0.138 (according to DLS) indicated a broader distribution. Additionally, the size difference of 16.9 nm based on Z-Average DLS results (Table 1) between both nanoparticles was reflected by different maxima of differential sedimentation coefficient distributions in AUC results. Distribution of SDL_NP4.2 therefore was shifted to higher average sedimentation coefficients compared to SDL_NP4.1.

Figure 15:
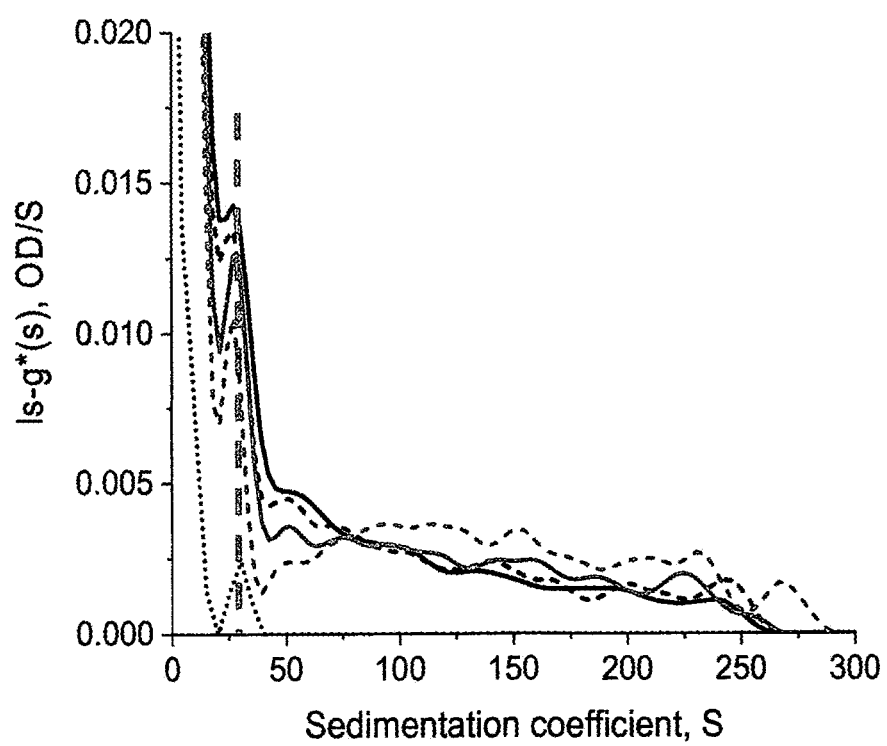
FIG. 15 depicts differential distributions of sedimentation coefficients of SDL_NP4.2 at c=0.498 mg/mL (gray dashed line), c=0.746 mg/mL (gray line), c=1.068 mg/mL (black dashed line), c=1.531 mg/mL (black line) in 55 w % human serum, with absorbance detection at λ=369 nm. The prominent component at a sedimentation coefficient of about 27 S, marked with a bold gray dashed line, refers to 55 w % human serum whose differential sedimentation coefficient distribution is illustrated by the black dotted line.
Figure 16:
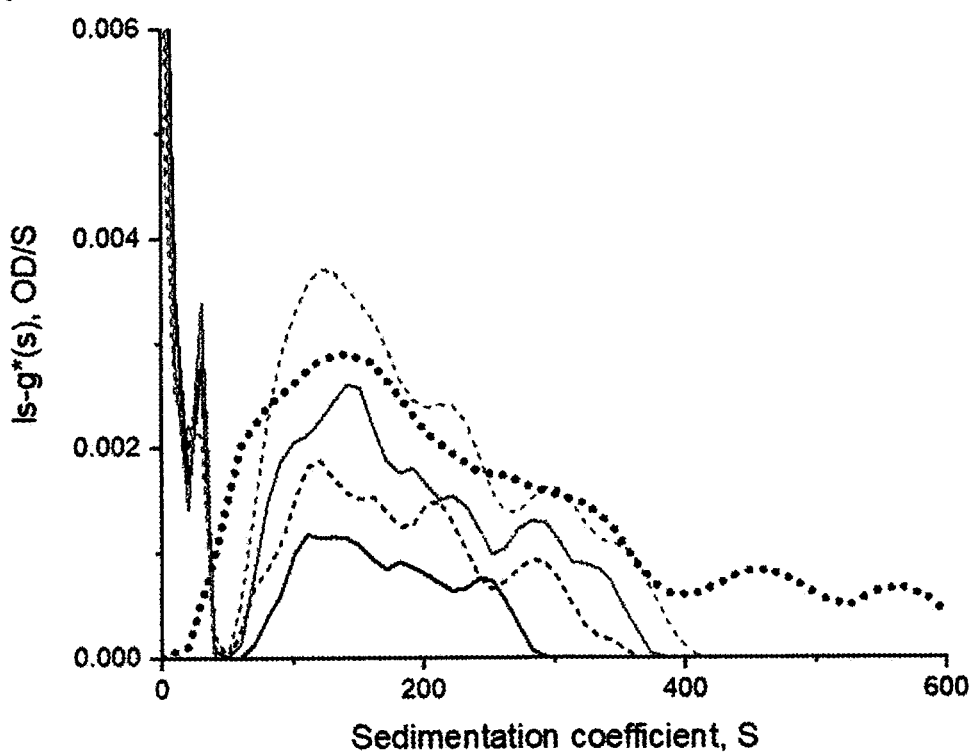
FIG. 16A depicts differential distributions of sedimentation coefficients of SDL_NP4.2 at c=0.498 mg/mL (black line), c=0.746 mg/mL (black dashed line), c=1.068 mg/mL (gray line), c=1.531 mg/mL (gray dashed line) in 55 w % human serum, with absorbance detection at λ=635 nm (GC-33). The prominent component of the distribution at a sedimentation coefficient of about 27 S refers to (55 w %) human serum, as shown in FIG. 14, marked with a bold gray dashed line. For comparison, c=0.994 mg/mL of SDL_NP4.2 in pure water is shown as black dotted line.
In FIG. 16B, the corresponding linear correlation of optical densities measured at λ=635 nm plotted against the different concentrations (in mg/mL) is shown.
Figure 16:
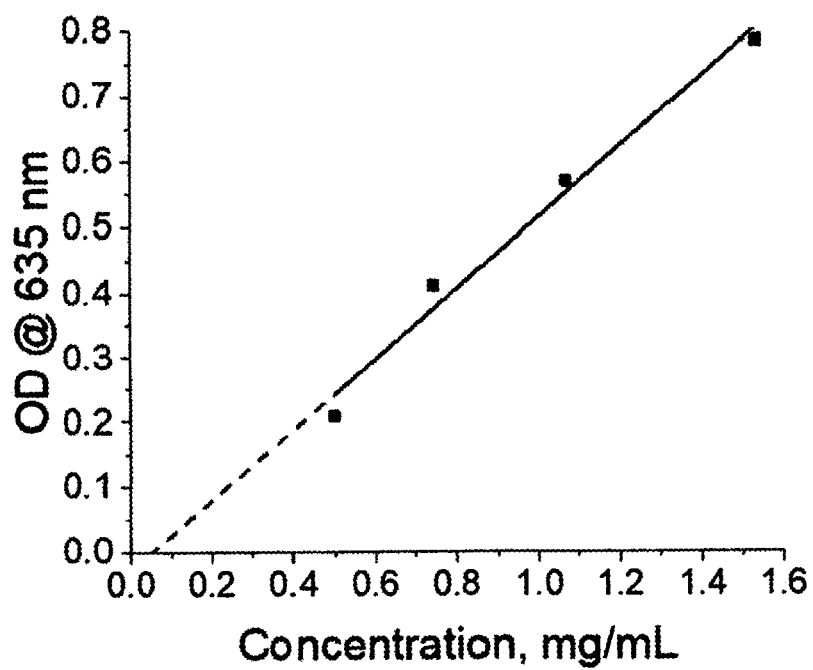

Differential distributions of sedimentation coefficients of SDL_NP4.2 at different concentrations, namely $c_1$=0.498 mg/mL, $c_2$=0.746 mg/mL, $c_3$=1.068 mg/mL, $c_4$=1.531 mg/mL, measured in 55 w % human serum with absorbance detection at $\lambda$=369 nm, are depicted in FIG. 15. The differential distributions of sedimentation coefficients obtained for each concentration of SDL_NP4.2 revealed a distribution centred at about 27 S, probably representing human serum components. Measurements of pure 55 w % human serum yielded confirmation by exhibiting also the peak in the distributions at 27 S. Furthermore, a broader distribution between 50 to 300 S appeared for each concentration. Also, the different concentrations of samples were only slightly observable in the distributions by specified peak maxima obtained from sedimentation velocity recorded at $\lambda$=396 nm. Due to the relatively high background optical density, a new wavelength had to be chosen, allowing for sufficient signal intensity (with respect to the background) in the investigation of nanoparticles of the NSS. As there is a specific absorbance maximum at $\lambda$=635 nm for the targeting dye (DY635), it was established that distributions determined from refractive index and absorbance measurements closely overlap in the DY635-carrying nanoparticles, indicating a similar differential distribution of sedimentation coefficients. Differential distributions of sedimentation coefficients of SDL_NP4.2 at the four different concentrations listed above, namely $c_1$=0.498 mg/mL, $c_2$=0.746 mg/mL, $c_3$=1.068 mg/mL, $c_4$=1.531 mg/mL, were measured in 55 w % human serum with absorbance detection at $\lambda$=635 nm. Results are depicted in FIG. 16A, showing that different nanoparticle concentrations are distinguishable using absorbance detection. The absorbance intensities were higher with increasing concentrations. By plotting the concentration of nanoparticles (as seen from increased detector responses) for each respective sample against the corresponding measured optical density at $\lambda$=635 nm, the linearity of signal intensities and their dependence on concentrations could be determined (FIG. 16B). Comparable with FIG. 15, a peak at about 27 S was observed due to components of human serum, while the distribution covering sedimentation coefficients between 30 to 400 S correspond to the nanoparticles analyzed. By using absorbance detection at $\lambda$=635 nm, nanoparticles in 55 w % human serum were resolved satisfactorily. Different nanoparticle concentrations were detected in a biofluid, reflecting conditions for applications of these drug delivery systems (i.e. NSS). The result of the measurement further revealed the integrity and comparability of nanoparticles analyzed in human serum-containing media, which is essential for applications in medicine/pharmacy. In particular, the comparison of differential sedimentation coefficient distributions of samples in 55 w % human serum vs. water established the similarity in appearance, such that stability conditions of nanoparticle suspensions close to application reality may be tested in the future. Moreover, the demonstration of identical properties of nanoparticles SDL_NP4.1 and SDL_NP4.2, regarding their apparent differential sedimentation coefficient distributions, also suggested that nanoparticles with a lower dye concentration, e.g. of the mentioned DY635, would exhibit the same integrity in human serum.

The invention claimed is:

1. A method for determining at least one physicochemical property of a nanoscale system (NSS), comprising:
    a) generating a multi-dimensional sedimentation analysis map associated with the NSS;
    b) conducting analytical ultracentrifugation (AUC) of an NSS dispersion or an NSS solution, the NSS dispersion or the NSS solution comprising the NSS and a solvent, wherein conducting AUC comprises measuring in time intervals an optical signal in radial direction across an AUC cell containing the NSS dispersion or NSS solution to obtain a sedimentation profile;
    c) determining a sedimentation coefficient value from the sedimentation profile;
    d) inserting the sedimentation coefficient value onto the multi-dimensional sedimentation analysis map; and
    e) deriving from the multi-dimensional sedimentation analysis map the physicochemical properties of the NSS.

2. The method of claim 1, wherein generating the multi-dimensional sedimentation analysis map comprises conducting AUC of a known NSS dispersion or a known NSS solution under same conditions as the AUC for the NSS dispersion or NSS solution, wherein the known NSS dispersion or known NSS solution comprise a known NSS and a solvent.

3. The method of claim 1, wherein the optical signal includes a light absorption, a refractive index, or a fluorescence.

4. The method of claim 3, wherein measuring the optical signal includes measuring the light absorption at a wavelength corresponding to an absorption maximum of a component of the NSS.

5. The method of claim 4, wherein measuring the light absorption is conducted at two different wavelengths corresponding to absorption maxima of two components of the NSS.

6. The method of claim 2, wherein a composition of the NSS is a same composition as a composition of the known NSS for generating the multi-dimensional sedimentation analysis map.

7. The method of claim 2, wherein a composition of the NSS is unknown with regard to at least one component of the NSS.

8. The method of claim 1, wherein the physicochemical property is selected from a size of the NSS, an amount of the NSS, a density of the NSS, an amount of a component of the NSS, a stability of the NSS, an integrity of the NSS, a purity of the NSS, a molecular weight of a polymeric component of the NSS, a dispersity of the NSS, a degradation kinetic of the NSS, or any combination thereof.

9. The method of claim 1, wherein the sedimentation coefficient value and a corresponding differential distribution of sedimentation coefficients provide a finger-print of the NSS.

10. The method of claim 1, wherein the NSS comprises at least two components.

11. The method of claim 10, wherein the NSS is a nanoscale drug delivery system (NDDS).

12. The method of claim 11, wherein the NDDS comprises a polymer and a drug.

13. The method of claim 12, wherein the polymer includes a biodegradable polymer.

14. The method of claim 12, wherein the NDDS further comprises a targeting dye moiety.

15. The method of claim 12, wherein the NDDS further comprises a surfactant.

16. The method of claim 1, wherein step e) comprises calculating with a computer the physicochemical property of the NSS.

17. The method of claim 1, wherein inserting the sedimentation coefficient value onto the multi-dimensional sedimentation analysis map comprises performing multiple regression analysis.

18. The method of claim 1, wherein the method provides information about a stability of the NSS by varying a parameter selected from the solvent or a temperature, or a storage time, a surfactant, or an additive.

19. The method of claim 1, wherein the method provides quantitative information about the at least one physicochemical property of the NSS.

\* \* \* \* \*